(12) United States Patent
Pang et al.

(10) Patent No.: US 10,003,966 B2
(45) Date of Patent: Jun. 19, 2018

(54) KEY CONFIGURATION METHOD AND APPARATUS

(71) Applicant: Huawei Device (Dongguan) Co., Ltd., Dongguan (CN)

(72) Inventors: Gaokun Pang, Shenzhen (CN); Zhiming Ding, Shenzhen (CN); Su Lu, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 240 days.

(21) Appl. No.: 15/139,749

(22) Filed: Apr. 27, 2016

(65) Prior Publication Data
US 2016/0242030 A1 Aug. 18, 2016

Related U.S. Application Data

(63) Continuation of application No. PCT/CN2013/086063, filed on Oct. 28, 2013.

(51) Int. Cl.
H04W 12/04 (2009.01)
H04L 9/08 (2006.01)
(Continued)

(52) U.S. Cl.
CPC ............ H04W 12/04 (2013.01); H04L 9/002 (2013.01); H04L 9/0827 (2013.01);
(Continued)

(58) Field of Classification Search
None
See application file for complete search history.

(56) References Cited

U.S. PATENT DOCUMENTS 7,181,014 B1 * 2/2007 Srivastava ............ H04L 9/0833
380/278
8,156,334 B2 4/2012 Ho
(Continued)

FOREIGN PATENT DOCUMENTS

CN 1832397 A 9/2006
CN 101094062 A 12/2007
(Continued)

OTHER PUBLICATIONS

Partial English Translation and Abstract of Chinese Patent Application No. CN101114901, May 12, 2016, 7 pages.
(Continued)

Primary Examiner — Morshed Mehedi
(74) Attorney, Agent, or Firm — Conley Rose, P.C.

(57) ABSTRACT

A key configuration method includes acquiring, by a first device, a public key of a second device through a secure medium; sending, by the first device, information used for obtaining a shared key to the second device; and obtaining, by the second device, a shared key using a private key of the second device and the information that is used for obtaining a shared key. The first device obtains the shared key using the information used for obtaining a shared key or using a private key of the first device. The present disclosure ensures that the public key of the second device reaches the first device, avoids that an attacker masquerades as the second device to establish a secure connection with the first device, so that the attacker cannot listen to a message between the first device and the second device.

15 Claims, 10 Drawing Sheets

(51) Int. Cl.
 H04L 9/00 (2006.01)
 H04L 9/32 (2006.01)
 H04W 4/00 (2018.01)
 *H04L 29/06* (2006.01)
 *H04W 12/06* (2009.01)
 *H04W 76/02* (2009.01)

(52) U.S. Cl.
 CPC .......... H04L 9/0841 (2013.01); H04L 9/0863 (2013.01); H04L 9/3226 (2013.01); H04L 63/061 (2013.01); H04W 4/008 (2013.01); *H04L 63/0428* (2013.01); *H04L 63/18* (2013.01); *H04L 2463/062* (2013.01); *H04W 12/06* (2013.01); *H04W 76/023* (2013.01)

(56) References Cited

U.S. PATENT DOCUMENTS

| | | | |
|---|---|---|---|
| 2004/0228492 | A1* | 11/2004 | Park ................. H04L 9/0825 380/277 |
| 2009/0161876 | A1* | 6/2009 | Sherkin ............. H04L 9/3066 380/278 |
| 2010/0199095 | A1 | 8/2010 | Ho |
| 2010/0262834 | A1* | 10/2010 | Freeman ............ G06F 21/31 713/184 |
| 2012/0027205 | A1* | 2/2012 | Liu .................... H04L 9/0844 380/44 |
| 2012/0314865 | A1 | 12/2012 | Kitchen |
| 2013/0036231 | A1 | 2/2013 | Suumaki |
| 2014/0032935 | A1* | 1/2014 | Kim .................. G06F 21/6218 713/193 |
| 2014/0093083 | A1* | 4/2014 | Dadu ................. G06F 21/62 380/275 |
| 2014/0247943 | A1 | 9/2014 | Harkins |

FOREIGN PATENT DOCUMENTS

| | | |
|---|---|---|
| CN | 101114901 A | 1/2008 |
| CN | 101459506 A | 6/2009 |
| CN | 101499908 A | 8/2009 |
| EP | 2173055 A1 | 4/2010 |

OTHER PUBLICATIONS

Partial English Translation and Abstract of Chinese Patent Application No. CN1832397, May 12, 2016, 9 pages.
Partial English Translation and Abstract of Chinese Patent Application No. CN101094062, May 12, 2016, 6 pages.
"Wi-Fi Simple Configuration Protocol and Usability Best Practices for the Wi-Fi Protected Setup Program," XP002733946, WiFi Alliance, Internet Citation, Version 2.0.1, Retrieved from the Internet: URL:http://www.wi-fi.org/system/files/wsc_best_practices_v2_0_1.pdf [retrieved on Dec. 18, 2014], Apr. 2011, 30 pages.
"Wi-Fi Protected Setup Specification," Version 1.0h, Retrieved from the Internet: URL: http://gpl.back2roots.org/source/puma5/netgear/CG3200-1TDNDS_GPL/ap/apps/wpa2/original/Wi-Fi Protected Setup Specification 1.0h.pdf [retrieved on Jun. 26, 2012], Dec. 2006, 110 pages.
Coleman, D., "Wi-Fi Protected Setup (WPS)," In: CWSP Certified Wireless Security Professional Official: Study Guide, XP055216095, Sep. 24, 2015, 6 pages.
Foreign Communication From a Counterpart Application, European Application No. 13896356.6, Extended European Search Report dated Sep. 14, 2016, 10 pages.
Foreign Communication From a Counterpart Application, PCT Application No. PCT/CN2013/086063, English Translation of International Search Report dated Aug. 13, 2014, 2 pages.
Foreign Communication From a Counterpart Application, PCT Application No. PCT/CN2013/086063, English Translation of Written Opinion dated Aug. 13, 2014, 15 pages.

* cited by examiner

KEY CONFIGURATION METHOD AND APPARATUS

CROSS-REFERENCE TO RELATED APPLICATIONS

This application is a continuation of International Application No. PCT/CN2013/086063, filed on Oct. 28, 2013, which is hereby incorporated by reference in its entirety.

TECHNICAL FIELD

The present disclosure relates to the field of network communications technologies, and in particular, to a key configuration method and apparatus.

BACKGROUND

Since the wireless local area network standard Institute of Electrical and Electronics Engineers (IEEE) 802.11 is released in 1997, under the promotion of the WiFi alliance formed by many companies advanced in the industry, a WiFi technology is developed rapidly with advantages of rapid deployment, convenient use, high transmission rate, and the like. Currently, the WiFi technology has been widely applied in various industries. Existing notebook computers, personal digital assistants (PDAs), mobile phones, and the like all support the WiFi technology. Access points of a WiFi network are distributed in hotels, cafes, schools, hospitals, and other places. Therefore, the WiFi technology is everywhere in the life.

With the development and wide application of the WiFi technology, requirements on related security technologies emerge. WiFi protected setup (WPS) is one of technologies for ensuring security when a WiFi connection is established. The WPS mainly emphasizes two points, namely, security and simplicity, that is, a configuration process needs to be simple, and a configured network needs to be secure. The existing WPS is mainly based on a key exchange algorithm.

Currently, scenarios in which the WPS is applied mainly include the following two scenarios. A first scenario is that a key is configured between a terminal used as an enrollee (a registered party) and an access point (AP) used as a registrar, so that the terminal and the AP can perform data interaction with each other based on the configured key subsequently. A second scenario is a peer to peer (P2P) authentication and configuration process. An objective of the research of P2P in the WiFi technology lies in that in a case in which there is no infrastructures such as a cellular network or a hotspot, direct peer to peer discovery can be implemented between terminal devices using a WiFi function, where in this scenario, one terminal is used as a client (client), the other terminal is used as a group owner (GO), a key is configured between the client and the GO, so that the client and the GO can perform data interaction with each other based on the configured key subsequently.

A key configuration manner used in the prior art is mainly based on a key exchange algorithm, that is, one pair of public and private keys are separately generated for a first device and a second device; the first device and the second device exchange public keys through an air interface, that is, the first device sends the public key of the first device to the second device through the air interface, the second device sends the public key of the second device to the first device through the air interface; the first device generates a shared key using the public key of the second device and the private key of the first device, the second device generates a shared key using the public key of the first device and the private key of the second device, and the first device and the second device perform subsequent secure transmission using the shared keys.

However, the key configuration manner in the prior art is easily attacked, an attacker easily intercepts, on the air interface, the public keys transmitted between devices, and separately performs the foregoing key exchange algorithm with the first device and the second device using a public key of the attacker, that is, masquerades as the second device to establish a secure connection with the first device, and masquerades as the first device to establish a secure connection with the second device, causing that a message transmitted between the first device and the second device is listened to by the attacker.

SUMMARY

In view of this, embodiments of the present disclosure provide a key configuration method and apparatus, so as to improve security of interaction between a first device and a second device.

According to a first aspect, an embodiment of the present disclosure provides a key configuring method, where the method includes acquiring, by a first device, a public key of a second device through a secure medium; and sending, by the first device, information used for obtaining a shared key to the second device, so that the second device obtains a shared key using a private key of the second device and the information that is used for obtaining a shared key, where the first device obtains the shared key using the information used for obtaining a shared key or using a private key of the first device.

According to an implementation manner of the first aspect, the acquiring, by a first device, a public key of a second device through a secure medium includes acquiring, by the first device, the public key of the second device from the second device in a manner of scanning an identifier, in a manner of using a universal serial bus (USB), or by means of near field communication (NFC).

In a first implementation manner of the first aspect, the information used for obtaining a shared key is a password generated by the first device; the obtaining, by the first device, the shared key using the information used for obtaining a shared key includes using, by the first device, the password as the shared key; the sending, by the first device, information used for obtaining a shared key to the second device includes, after encrypting the password using the public key of the second device, sending, by the first device, an encrypted password to the second device; and the obtaining, by the second device, a shared key using a private key of the second device and the information that is used for obtaining a shared key includes the obtaining, by the second device, a shared key using a private key of the second device and the information that is used for obtaining a shared key includes decrypting, by the second device, the encryption result using the private key of the second device, to obtain the password, and using the password as the shared key.

In a second implementation manner of the first aspect, the information used for obtaining a shared key is a public key of the first device; the sending, by the first device, information used for obtaining a shared key to the second device includes, after encrypting the public key of the first device using the public key of the second device, sending, by the first device, an encryption result to the second device; the obtaining, by the second device, a shared key using a private key of the second device and the information that is used for obtaining a shared key includes, after decrypting the encryption result using the private key of the second device, obtaining, by the second device, the public key of the first device, generating a password, using the password as the shared key, and after encrypting the password using the public key of the first device, sending an encryption result to the first device; and the obtaining, by the first device, the shared key using a private key of the first device includes, after decrypting the received encryption result using the private key of the first device, using, by the first device, the obtained password as the shared key.

In a third implementation manner of the first aspect, the first device and the second device predetermine a key exchange algorithm; the information used for obtaining a shared key is a public key of the first device; the obtaining, by the first device, the shared key using a private key of the first device includes generating, by the first device, the shared key using the public key of the second device and the private key of the first device according to the key exchange algorithm; and the obtaining, by the second device, a shared key using a private key of the second device and the information that is used for obtaining a shared key includes generating, by the second device, the shared key using the public key of the first device and the private key of the second device according to the key exchange algorithm.

According to any one of the foregoing implementation manners, the first device and the second device perform a secure connection using the shared key or a derivative key of the shared key.

According to the third implementation manner of the first aspect, the method further includes, after obtaining the shared key, encrypting, by the first device, a password using the shared key or a derivative key of the shared key, and sending an encryption result to the second device, so that the second device decrypts the received encryption result using the shared key obtained by the second device or the derivative key of the shared key, to obtain the password, where the password is used for a secure connection between the first device and the second device; or after obtaining the shared key, encrypting, by the second device, a password using the shared key or a derivative key of the shared key, and sending an encryption result to the first device, so that the first device decrypts the received encryption result using the shared key generated by the first device, to obtain the password, where the password is used for a secure connection between the first device and the second device.

According to the third implementation manner of the first aspect, the method further includes the predetermining, by the first device and the second device, a key exchange algorithm includes a parameter used by the key exchange algorithm being preconfigured on the first device and the second device; or receiving, by the first device and the second device, a parameter used by the key exchange algorithm and sent by a third-party configuration device.

According to the third implementation manner of the first aspect, the sending, by the first device, information used for obtaining a shared key to the second device includes, after encrypting the public key of the first device using the public key of the second device, sending, by the first device, an encryption result to the second device, so that the second device decrypts the encryption result, to obtain the public key of the first device.

With reference to any one of the foregoing implementation manners, the method further includes, after obtaining the shared key, generating, by the first device, a first verification value using at least one of the shared key, the derivative key of the shared key, and plaintext that is pre-agreed between the first device and the second device, and sending the first verification value to the second device, so that the second device generates a second verification value using at least one of the shared key obtained by the second device, the derivative key of the shared key, and the plaintext that is pre-agreed between the second device and the first device, and compares the generated second verification value with the received first verification value, where if the first verification value is consistent with the second verification value, the verification succeeds, and in a case in which the verification succeeds, the second device performs a secure connection with the first device using the shared key or the derivative key of the shared key.

With reference to any one of the foregoing implementation manners, the method further includes receiving, by the first device, a first verification value sent by the second device, where the first verification value is a verification value generated by the second device using at least one of the shared key, the derivative key of the shared key, and plaintext that is pre-agreed between the second device and the first device; and generating, by the first device, a second verification value using at least one of the shared key obtained by the first device, the derivative key of the shared key, and the plaintext that is pre-agreed between the first device and the second device, and comparing the generated second verification value with the received first verification value, where if the first verification value is consistent with the second verification value, the verification succeeds, and in a case in which the verification succeeds, the first device performs a secure connection with the second device using the shared key or the derivative key of the shared key.

With reference to any one of the foregoing implementation manners, the first device sends, using the first message generated in a WPS authentication process, the information used for obtaining a shared key; or the first device sends, to the second device, a trigger message used for instructing the second device to start a WPS authentication process, and sends, using the second message generated in the WPS authentication process, the information used for obtaining a shared key; or the first device sends, using the first message generated in a four-way handshake process, the information used for obtaining a shared key; or the first device sends, using a trigger message used for instructing the second device to start a four-way handshake process, the information used for obtaining a shared key.

According to a second aspect, a key configuration method is provided, where the method includes providing, by a second device, a public key of the second device to a first device through a secure medium; receiving, by the second device, information used for obtaining a shared key and sent by the first device; and obtaining, by the second device, a shared key using a private key of the second device and the information that is used for obtaining a shared key, where the first device obtains the shared key using the information used for obtaining a shared key or using a private key of the first device.

In a first implementation manner of the second aspect, the providing, by a second device, a public key of the second device to a first device through a secure medium includes providing, by the second device, the public key of the second device to the first device in a manner of providing an identifier to the first device to perform scanning, in a manner of using a USB, or by means of NFC.

With reference to the second aspect and the first implementation manner of the second aspect, the information used for obtaining a shared key is a password generated by the first device; the obtaining, by the first device, the shared key using the information used for obtaining a shared key includes using, by the first device, the password as the shared key; the receiving information used for obtaining a shared key and sent by the first device includes receiving an encryption result that is sent by the first device after the first device encrypts the password using the public key of the second device; and the obtaining a shared key using a private key of the second device and the information that is used for obtaining a shared key includes decrypting, by the second device, the encryption result using the private key of the second device, to obtain the password, and using the password as the shared key.

With reference to the second aspect and the first implementation manner of the second aspect, the information used for obtaining a shared key is a public key of the first device; the receiving information used for obtaining a shared key and sent by the first device includes receiving an encryption result that is sent by the first device after the first device encrypts the public key of the first device using the public key of the second device; the obtaining a shared key using a private key of the second device and the information that is used for obtaining a shared key includes, after decrypting the encryption result using the private key of the second device, obtaining, by the second device, the public key of the first device, generating a password, using the password as the shared key, and after encrypting the password using the public key of the first device, sending an encryption result to the first device; and the obtaining, by the first device, the shared key using a private key of the first device includes, after decrypting the received encryption result using the private key of the first device, using, by the first device, the obtained password as the shared key.

With reference to the second aspect and the first implementation manner of the second aspect, the method further includes predetermining, by the first device and the second device, a key exchange algorithm; the information used for obtaining a shared key is a public key of the first device; the obtaining, by the first device, the shared key using a private key of the first device includes generating, by the first device, the shared key using the public key of the second device and the private key of the first device according to the key exchange algorithm; and the obtaining a shared key using a private key of the second device and the information that is used for obtaining a shared key includes generating, by the second device, the shared key using the public key of the first device and the private key of the second device according to the key exchange algorithm.

With reference to the foregoing implementation manners, the first device and the second device perform a secure connection using the shared key or a derivative key of the shared key.

With reference to the foregoing implementation manners, the method further includes receiving, by the second device, an encryption result that is obtained after the first device encrypts a password using the shared key or a derivative key of the shared key after obtaining the shared key, and decrypting the received encryption result using the obtained shared key, to obtain the password, where the password is used for a secure connection between the first device and the second device; or after generating the shared key, encrypting, by the second device, a password using the shared key or a derivative key of the shared key, and sending an encryption result to the first device, so that the first device decrypts the received encryption result using the obtained shared key, to obtain the password, where the password is used for a secure connection between the first device and the second device.

With reference to the foregoing implementation manners, the predetermining, by the first device and the second device, a key exchange algorithm includes a parameter used by the key exchange algorithm being preconfigured on the first device and the second device; or receiving, by the first device and the second device, a parameter used by the key exchange algorithm and sent by a third-party configuration device.

With reference to the foregoing implementation manners, the receiving information used for obtaining a shared key and sent by the first device includes receiving, by the second device, an encryption result that is obtained after the first device encrypts the public key of the first device using the public key of the second device; and decrypting the encryption result, to obtain the public key of the first device.

With reference to the foregoing implementation manners, the method further includes, after obtaining the shared key, generating, by the first device, a first verification value using at least one of the shared key, the derivative key of the shared key, and plaintext that is pre-agreed between the first device and the second device, and sending the first verification value to the second device; and generating, by the second device, a second verification value using at least one of the shared key obtained by the second device, the derivative key of the shared key, and the plaintext that is pre-agreed between the second device and the first device, and comparing the generated second verification value with the received first verification value, where if the first verification value is consistent with the second verification value, the verification succeeds, and in a case in which the verification succeeds, the second device performs a secure connection with the first device using the shared key or the derivative key of the shared key.

With reference to the foregoing implementation manners, after obtaining the shared key, the second device generates a third verification value using at least one of the shared key, the derivative key of the shared key, and plaintext that is pre-agreed between the second device and the first device, and sends the third verification value to the first device, so that the first device generates a fourth verification value using at least one of the shared key obtained by the first device, the derivative key of the shared key, and the plaintext that is pre-agreed between the first device and the second device, and compares the generated fourth verification value with the received third verification value, where if the third verification value is consistent with the fourth verification value, the verification succeeds, and in a case in which the verification succeeds, the first device performs a secure connection with the second device using the shared key or the derivative key of the shared key.

With reference to the foregoing implementation manners, the second device receives, using the first message generated in a WPS authentication process, the information used for obtaining a shared key; or the second device receives a trigger message used for instructing the second device to start a WPS authentication process and sent by the first device, and receives, using the second message generated in the WPS authentication process, the information used for obtaining a shared key; or the second device receives, using the first message generated in a four-way handshake process, the information used for obtaining a shared key; or the second device receives, using a trigger message used for instructing the second device to start a four-way handshake process, the information used for obtaining a shared key.

According to a third aspect, the present disclosure provides a key configuration apparatus, where the apparatus is located in a first device, and the apparatus includes a secure acquisition unit configured to acquire a public key of a second device through a secure medium; and a key processing unit configured to send information used for obtaining a shared key to the second device, and obtain the shared key using the information used for obtaining a shared key or using a private key of the first device, where the information used for obtaining a shared key is used for the second device to obtain the shared key with reference to a private key of the second device.

According to the foregoing implementation manner of the third aspect, the secure acquisition unit is configured to acquire the public key of the second device from the second device in a manner of scanning an identifier, in a manner of using a USB, or by means of NFC.

In a first implementation manner of the third aspect, the key processing unit includes a first key generating subunit configured to generate a password, and use the password as the shared key; and a first key transmission subunit configured to, after the password is encrypted using the public key of the second device, send an encryption result to the second device, so that the second device decrypts the encryption result using the private key of the second device, to obtain the password, and uses the password as the shared key.

In a second implementation manner of the third aspect, the key processing unit includes a second key transmission subunit configured to, after a public key of the first device is encrypted using the public key of the second device, send an encryption result to the second device; and a second key generating subunit configured to, after the encryption result sent by the second device is received, decrypt the encryption result using the private key of the first device, and use the obtained password as the shared key.

In a third implementation manner of the second aspect, the key processing unit includes a third key generating subunit configured to generate the shared key using the public key of the second device and the private key of the first device according to a key exchange algorithm predetermined by the first device and the second device; and a third key transmission subunit configured to send a public key of the first device to the second device, so that the second device generates the shared key using the public key of the first device and the private key of the second device according to the key exchange algorithm.

According to any one of the foregoing implementation manners of the third aspect, the shared key or a derivative key of the shared key is used for a secure connection between the first device and the second device.

In the third implementation manner of the third aspect, the third key generating subunit is further configured to, after the shared key is obtained, encrypt a password using the shared key or a derivative key of the shared key; and the third key transmission subunit is further configured to send an encryption result generated by the third key generating subunit to the second device; or the third key transmission subunit is further configured to receive an encryption result sent by the second device; and the third key generating subunit is further configured to decrypt, using the obtained shared key, the encryption result received by the third key transmission subunit, to obtain the password, where the password is used for a secure connection between the first device and the second device.

In the third implementation manner of the third aspect, the apparatus further includes a parameter configuration unit configured to store a preconfigured parameter used by the key exchange algorithm, or receive and store a parameter used by the key exchange algorithm and sent by a third-party configuration device.

According to any one of the foregoing implementation manners of the third aspect, the secure acquisition unit is further configured to acquire address information of the second device through the secure medium; and the key processing unit is configured to send the information used for obtaining a shared key to the second device according to the address information of the second device.

In the third implementation manner of the third aspect, when sending the public key of the first device to the second device, the third key transmission subunit is configured to, after the public key of the first device is encrypted using the public key of the second device, send an encryption result to the second device, so that the second device obtains the public key of the first device after decrypting the encryption result.

According to any one of the foregoing implementation manners of the third aspect, the apparatus further includes a first verification unit configured to, after the key processing unit obtains the shared key, generate a first verification value using at least one of the shared key, the derivative key of the shared key, and plaintext that is pre-agreed between the first device and the second device, and send the first verification value to the second device, so that the second device generates a second verification value using at least one of the shared key obtained by the second device, the derivative key of the shared key, and the plaintext that is pre-agreed between the second device and the first device, and compares the generated second verification value with the received first verification value, where if the first verification value is consistent with the second verification value, the verification succeeds, and in a case in which the verification succeeds, the second device performs a secure connection with the first device using the shared key or the derivative key of the shared key.

According to any one of the foregoing implementation manners of the third aspect, the apparatus further includes a second verification unit configured to, after a third verification value sent by the second device is received, generate a fourth verification value using at least one of the shared key obtained by the key processing unit, the derivative key of the shared key, and plaintext that is pre-agreed between the first device and the second device, and compare the generated fourth verification value with the received third verification value, where if the third verification value is consistent with the fourth verification value, the verification succeeds, and in a case in which the verification succeeds, the first device performs a secure connection with the second device using the shared key or the derivative key of the shared key, where the third verification value is generated by the second device after the second device obtains the shared key and using at least one of the shared key, the derivative key of the shared key, and the plaintext that is pre-agreed between the second device and the first device.

According to any one of the foregoing implementation manners of the third aspect, the key processing unit is configured to send, using the first message generated in a WPS authentication process, the information used for obtaining a shared key; or send, to the second device, a trigger message used for instructing the second device to start a WPS authentication process, and send, using the second message generated in the WPS authentication process, the information used for obtaining a shared key; or send, using the first message generated in a four-way handshake process, the information used for obtaining a shared key; or send, using a trigger message used for instructing the second device to start a four-way handshake process, the information used for obtaining a shared key.

According to a fourth aspect, an embodiment of the present disclosure provides a key configuration apparatus, where the apparatus is located in a second device, and the apparatus includes a secure sending unit configured to provide a public key of the second device to a first device through a secure medium; and a key processing unit configured to obtain a shared key using a private key of the second device and information that is used for obtaining a shared key and is sent by the first device, where the first device obtains the shared key using the information used for obtaining a shared key or using a private key of the first device.

According to the foregoing implementation manner of the fourth aspect, the secure sending unit is configured to provide the public key of the second device to the first device in a manner of providing an identifier to the first device to perform scanning, in a manner of using a USB, or by means of NFC.

In a first implementation manner of the fourth aspect, the key processing unit includes a first information transmission subunit configured to receive an encryption result that is sent by the first device and is obtained after the first device encrypts, using the public key of the second device, a password generated by the first device; and a first key generating subunit configured to decrypt the encryption result using the private key of the second device, to obtain the password, and use the password as the shared key.

In a second implementation manner of the fourth aspect, the key processing unit includes a second information transmission subunit configured to receive an encryption result that is obtained after the first device encrypts a public key of the first device using the public key of the second device, and send an encryption result obtained by a second key generating subunit to the first device, so that the first device decrypts the received encryption result using the private key of the first device, and uses an obtained password as the shared key; and the second key generating subunit configured to decrypt, using the private key of the second device, the encryption result received by the second information transmission subunit, to obtain the public key of the first device, generate a password, use the password as the shared key, and obtain an encryption result after encrypting the password using the public key of the first device.

In a third implementation manner of the fourth aspect, the key processing unit includes a third information transmission subunit configured to receive the public key of the first device sent by the first device; and a third key generating subunit configured to generate the shared key using the public key of the first device and the private key of the second device according to a key exchange algorithm predetermined by the first device and the second device.

According to any one of the foregoing implementation manners of the third aspect, the shared key is used for a secure connection between the first device and the second device.

According to the third implementation manner of the fourth aspect, the third information transmission subunit is further configured to receive an encryption result that is obtained after the first device encrypts a password using the shared key or a derivative key of the shared key after the first device generates the shared key using the public key of the second device and the private key of the first device according to the key exchange algorithm; and the third key generating subunit is further configured to decrypt, using the obtained shared key, the encryption result received by the third information transmission subunit, to obtain the password, where the password is used for a secure connection between the first device and the second device; or the third key generating subunit is further configured to, after the shared key is obtained, encrypt a password using the shared key or a derivative key of the shared key, to obtain an encryption result; and the third information transmission subunit is further configured to send the encryption result generated by the third key generating subunit to the first device, so that the first device decrypts the received encryption result after generating the shared key using the public key of the second device and the private key of the first device according to the key exchange algorithm, to obtain the password, where the key is used for a secure connection between the first device and the second device.

According to the third implementation manner of the fourth aspect, the apparatus further includes a parameter configuration unit configured to store a preconfigured parameter used by the key exchange algorithm, or receive and store a parameter used by the key exchange algorithm and sent by a third-party configuration device.

According to the third implementation manner of the fourth aspect, the third information transmission subunit is configured to receive an encryption result that is sent by the first device and is obtained after the first device encrypts the public key of the first device using the public key of the second device, and decrypt the encryption result, to obtain the public key of the first device.

In any one of the foregoing implementation manners of the third aspect, the apparatus further includes a first verification unit configured to, if a first verification value sent by the first device is received, generate a second verification value using at least one of the shared key obtained by the key processing unit, the derivative key of the shared key, and plaintext that is pre-agreed between the second device and the first device, and compare the generated second verification value with the received first verification value, where if the first verification value is consistent with the second verification value, the verification succeeds, and in a case in which the verification succeeds, the second device performs a secure connection with the first device using the shared key or the derivative key of the shared key.

In any one of the foregoing implementation manners of the fourth aspect, the apparatus further includes a second verification unit configured to, after the key processing unit obtains the shared key, generate a third verification value using at least one of the shared key, the derivative key of the shared key, and plaintext that is pre-agreed between the second device and the first device, and send the third verification value to the first device, so that the first device generates a fourth verification value using at least one of the shared key obtained by the first device, the derivative key of the shared key, and the plaintext that is pre-agreed between the first device and the second device, and compares the generated fourth verification value with the received third verification value, where if the third verification value is consistent with the fourth verification value, the verification succeeds, and in a case in which the verification succeeds, the first device performs a secure connection with the second device using the shared key or the derivative key of the shared key.

In any one of the foregoing implementation manners of the fourth aspect, the key processing unit is configured to acquire, using the first message generated in a WPS authentication process, the information used for obtaining a shared key; or acquire, using the second message generated in a WPS authentication process, the information used for obtaining a shared key; or acquire, using the first message generated in a four-way handshake process, the information used for obtaining a shared key; or acquire, using a trigger message used for instructing the second device to start a four-way handshake process, the information used for obtaining a shared key.

As can be seen from the foregoing technical solutions, in the present disclosure, a first device acquires a public key of a second device through a secure medium, which ensures that the public key of the second device reaches the first device, so that the first device can generate a shared key according to the public key of the second device, which avoids that an attacker masquerades as the second device to establish a secure connection with the first device, so that the attacker cannot listen to a message between the first device and the second device, thereby improving security of interaction between the first device and the second device.

DESCRIPTION OF EMBODIMENTS

To make the objectives, technical solutions, and advantages of the present disclosure clearer, the following describes the present disclosure in detail with reference to the accompanying drawings and the embodiments.

The core idea of the present disclosure includes acquiring, by a first device, a public key of a second device through a secure medium, and sending information used for obtaining a shared key to the second device; and obtaining, by the second device, a shared key using a private key of the second device and the information that is used for obtaining a shared key, where the first device obtains the shared key using the information used for obtaining a shared key or using a private key of the first device.

In the present disclosure, a key exchange manner may be used to configure a shared key, or a key exchange manner may not be used to configure a shared key. The following describes, in detail using several specific embodiments, the method provided in the present disclosure.

Embodiment 1

In this embodiment, a key exchange manner is used to configure a shared key; a first device and a second device predetermine a key exchange algorithm, where the key exchange algorithm is an algorithm used when the first device and the second device generate a shared key subsequently, and may be, but not limited to, a Diffie-Hellman key exchange (D-H) algorithm, an Rivest-Shamir-Adleman (RSA) algorithm, or an ElGamal algorithm, or the like; and pre-shared parameters are different according to different key exchange algorithms.

Manners of sharing a parameter used by a key exchange algorithm may include but not limited to the following two manners: Manner 1: the parameter used by the key exchange algorithm is preconfigured on the first device and the second device; Manner 2: the parameter used by the key exchange algorithm is sent to the first device and the second device using a third-party device.

Embodiments of the present disclosure all use the D-H algorithm as an example. The first device and the second device pre-share parameters g and P, the parameters g and P are pre-shared on the first device and the second device, where P is a prime number, and g is a primitive root of P. In addition, the first device and the second device each have a public key and a private key, where the public key and the private key of the first device are PkeyA and keyA respectively, and the public key and the private key of the second device are PkeyB and keyB respectively. The foregoing configuration exists in subsequent Embodiment 2 to Embodiment 5 of the present disclosure, and no further details are provided.

Figure 1:
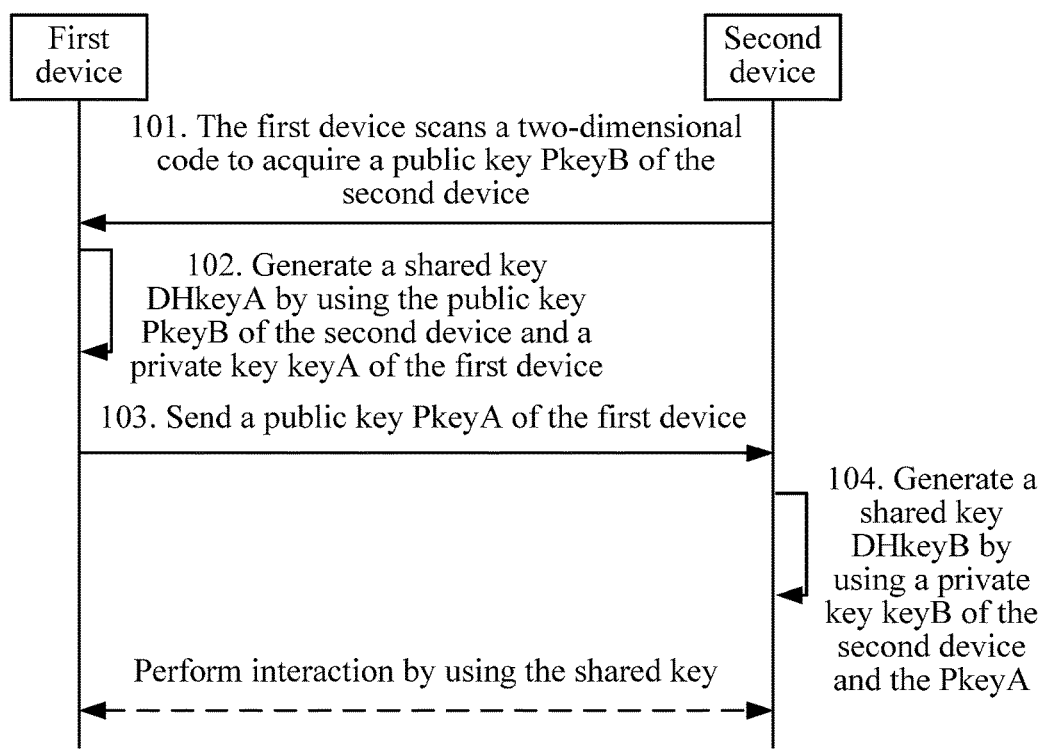
FIG. 1 is a schematic flowchart of a key configuration method according to Embodiment 1 of the present disclosure.

FIG. 1 is a schematic flowchart of a key configuration method according to Embodiment 1 of the present disclosure. As shown in FIG. 1, the procedure may include the following steps.

Step 101: A first device acquires a public key PkeyB of a second device through a secure medium.

The secure medium described in this step is a medium that can ensure that the public key PkeyB of the second device can reach the first device without being intercepted by an intermediate attacker, and may include but not limited to the following: a manner of scanning an identifier, a manner of using a USB, or by means of NFC.

FIG. 1 uses an example in which a manner of scanning an identifier is used. The first device scans an identifier of the second device, where the identifier may be a two-dimensional code, a barcode, or the like. The identifier includes the public key PkeyB of the second device, and may further include device information of the second device, where the device information is mainly address information, and may further include but not limited to the following device information: a universally unique identifier (UUID), a manufacturer, a serial number, a device capability, channel information, and the like. The channel information may help the first device to rapidly discover the second device through a Wifi network, thereby fastening the execution efficiency of step 103. The device capability refers to an algorithm, an authentication method, device role information, device type information, and the like that are supported by the device, where the device role information refers to a role of the device during registration, and may be an enrollee, a registrar, a client, a GO, or the like. The device type information may be a wireless terminal (such as a Wifi terminal, a Bluetooth® terminal, or a Zigbee® terminal, for example, a mobile phone, a computer, or a sensor), an AP (which is an AP in a Wifi network, or may be a Bluetooth gateway in a Bluetooth network, or may be an Internet of things gateway in a Zigbee network, or the like), a sensor node, a central node, or the like.

Step 102: The first device generates a shared key DHkeyA using the public key PkeyB of the second device and a private key keyA of the first device.

Herein, the first device generates the shared key DHkey using a key exchange algorithm pre-shared with the second device. Using the D-H algorithm as an example, a public key PkeyA of the first device is:

PkeyA=(g^keyA)mod(P), where keyA is the private key of the first device, and is a random number;

the public key PkeyB of the second device is:

PkeyB=(g^keyB)mod(P), where keyB is the private key of the second device, and is also a random number; and the shared key DHkeyA generated using the PkeyA and the keyA is:

$$DHkeyA=((PkeyB)^{\wedge}keyA)\mod(P).$$

Step 103: The first device sends a public key PkeyA of the first device to the second device according to device information (that is, address information of the second device) of the second device.

Optionally, the public key PkeyA of the first device may be encrypted using the public key PkeyB of the second device, and an encryption result is sent to the second device, which can improve security.

There may be two manners for encryption using a public key.

Encryption manner 1: If a public key is a public key used for asymmetric encryption, the public key may be directly used for encryption, and decryption needs to be performed using a corresponding private key.

Encryption manner 2: Partial information of a public key is used during encryption, or information derived based on a public key is used as a symmetric key for encryption, and during decryption, a symmetric key needs to be used for decryption. The public key is a public key used for key exchange or a public key used for asymmetric encryption.

One of the foregoing two encryption manners may be used in a subsequent encryption and decryption process according to a specific situation. Herein, Encryption manner 2 is used for encryption.

Further, the first device may generate a verification value using at least one of the generated shared key DHkeyA, a derivative key of the DHkeyA, and plaintext (the plaintext is pre-agreed between the first device and the second device), and send the verification value to the second device, so that the second device performs verification. A manner of generating a verification value may be pre-agreed between the first device and the second device, for example, a manner of generating a hash (hash) value is used.

The foregoing plaintext may be but not limited to the public key PkeyB of the second device, a parameter pre-shared with the second device, a parameter (for example, a nonce nonce generated by the second device) included in the device information acquired by the second device, and partial content in a message sent to the second device by the first device. In addition, this embodiment of the present disclosure is not limited to a derivative key generating manner, as long as the first device and the second device pre-agree a derivative key generating manner.

For example, the first device may perform hash on the public key PkeyB of the second device, to obtain a hash value, use the hash value as the verification value, and send the verification value to the second device. For another example, the first device may generate a verification value with reference to the shared key DHkeyA and a parameter that is shared with the second device, and then, send the verification value to the second device.

Step 104: The second device receives the public key PkeyA of the first device, and generates a shared key DHkeyB using the PkeyA and the private key keyB of the second device.

Before this step, if the first device sends an encryption result to the second device, the second device first decrypts the encryption result, to obtain the public key PkeyA of the first device. Herein, a manner in which the second device generates public and private keys (PkeyB and keyB) can ensure that a result obtained through encryption using the public key PkeyB can be decrypted. This manner belongs to the prior art, and no further details are provided herein again.

Similarly, using the D-H algorithm as an example, the shared key DHkeyB generated by the second device is:

$$DHkeyB=((PkeyA)^{\wedge}keyB)\mod(P).$$

As can be known from the D-H algorithm, DHkeyA=DHkeyB.

If the second device receives the verification value sent by the first device, the second device generates a verification value using at least one of the generated shared key DHkeyB, a derivative key of the DHkeyB, and the plaintext (the plaintext is pre-agreed between the second device and the first device), and compares the generated verification value with the received verification value, where if the generated verification value is consistent with the received verification value, the verification succeeds, and the second device can interact with the first device using the shared key DHkeyB subsequently.

Further, the second device may generate a verification value using at least one of the generated shared key DHkeyB, a derivative key of the DHkeyB, and the plaintext (the plaintext is pre-agreed between the second device and the first device), and send the verification value to the first device. After receiving the verification value, the first device also generates a verification value using at least one of the generated shared key DHkeyA, a derivative key of the DHkeyA, and the plaintext (the plaintext is pre-agreed between the first device and the second device), and compares the verification value with the received verification value, where if the generated verification value is consistent with the received verification value, the verification succeeds, and the first device can interact with the second device using the shared key DHkeyA subsequently.

The key configuration manner provided in Embodiment 1 can be well applied in a WPS authentication procedure and a four-way handshake procedure. The following describes a process in which the key configuration manner is applied in a WPS authentication procedure in detail using Embodiment 2 and Embodiment 3, and describes a process in which the key configuration manner is applied in a four-way handshake procedure using Embodiment 4 and Embodiment 5.

Embodiment 2

Figure 2:
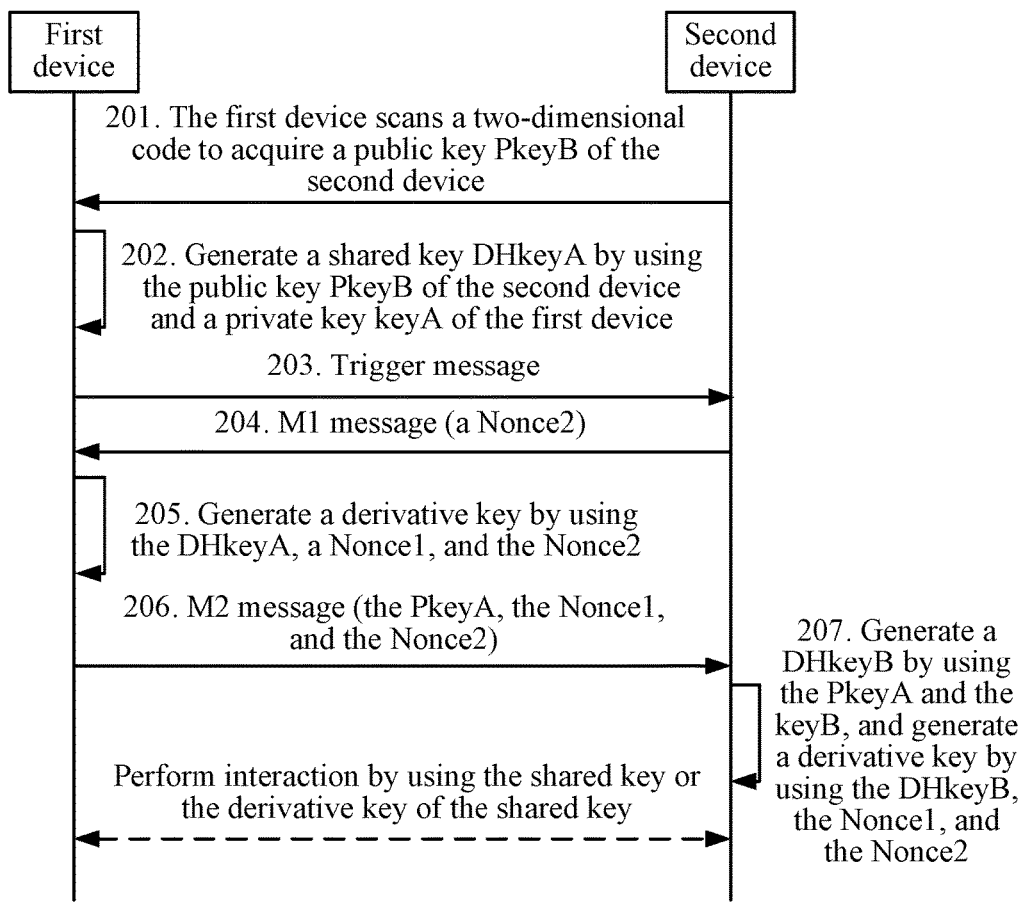
FIG. 2 is a schematic flowchart of a key configuration method according to Embodiment 2 of the present disclosure.

This embodiment uses an example in which key configuration is applied in a WPS authentication procedure. Assuming that in the WPS authentication procedure a first device is a registrar, and a second device is an enrollee, or a first device is a GO, and a second device is a client, in view of requirements of WPS authentication, an M1 message must be sent from the enrollee or the client. Based on this, a procedure of a key configuration method provided in Embodiment 2 of the present disclosure is shown in FIG. 2, and includes the following steps.

Step 201 is the same as step 101.

Step 202 is the same as step 102.

Step 203: The first device sends a trigger message to the second device.

The trigger message is used for instructing the second device to start key configuration, and the trigger message may be included in another message and then is sent, for example, the trigger message is included in a discovery message or a broadcast message, for example, if the first device is an AP, the trigger message may be sent using a broadcast message; or if the first device is a wireless terminal, the trigger message may be sent using a discovery message.

Step 204: The second device sends an M1 message to the first device.

The M1 message includes a version number, a nonce Nonce2 generated by the second device, and device information of the second device.

In addition, the second device may also send a verification value, such as a hash value of the PkeyB, which is generated using the public key PkeyB of the second device, so that the first device performs verification. If the first device receives the verification value, the first device first generates a verification value using the public key PkeyB of the second device, and compares the generated verification value with the received verification value, where if the generated verification value is consistent with the received verification value, the verification succeeds, and step 205 is performed.

Step 205: The first device generates a derivative key using DHkeyA, a nonce Nonce2 of the second device, and a nonce Nonce1 that is generated by the first device.

In addition to using the DHkeyA, the present disclosure is not limited to the manner and parameters that are used for the first device to generate a derivative key, as long as a manner that is pre-agreed between the first device and the second device is used. To adapt to an existing WPS authentication process to a greatest extent, the derivative key may be generated using the shared key DHkeyA, the nonce Nonce2 of the second device, and the nonce Nonce1 generated by the first device, and, the following manner may be used:

KDK=HMAC-SHA-256 DHKey A(Nonce2 ∥ EnrolleeMAC ∥ Nonce1), that is, KDK is a hash result of the DHkeyA, the Nonce2, a MAC address of the second device, and the Nonce1.

AuthKey ∥ KeyWrapKey ∥ EMSK=kdf(KDK, "Wi-Fi Easy and Secure Key Derivation", 640), that is, AuthKey, KeyWrapKey, and EMSK are a 640-bit key that is generated after the KDK is iterated with reference to a character string "Wi-Fi Easy and Secure Key Derivation", where AuthKey occupies 256 bits, KeyWrapKey occupies 128 bits, and EMSK occupies 256 bits. KDK, AuthKey, KeyWrapKey, and EMSK all can be used as the derivative key of the shared key.

Step 206: The first device sends an M2 message to the second device, where the M2 message includes a public key PkeyA of the first device, the Nonce1, and the Nonce2.

In addition, the first device may further generate a verification value using the M1 message and the M2 message in combination of the Authkey, for example, generate a hash value, so that the second device performs verification. If the verification value is sent using the M2 message, the M2 message used for generating the verification value is an M2 message that does not include the verification value.

Step 207: The second device generates a shared key DHkeyB using the public key PkeyA of the first device and a private key keyB of the second device, and generates a derivative key using the DHkeyB, the Nonce1, and the Nonce2.

For a manner of generating a derivative key, reference may be made to descriptions of step 205 herein.

If the second device receives the verification value, the second device also generates a verification value using the M1 message and the M2 message (that is, the M2 message that does not include the verification value) in combination with the derivative key Authkey that is obtained through calculation, and compares the generated verification value with the received verification value, where if the generated verification value is consistent with the received verification value, the verification succeeds, and the second device can interact with the first device using the shared key DHkeyB subsequently.

The second device may further generate a verification value using the Authkey generated by the second device, the M2 message, and a completion message, and send, using a completion message, the verification value to the first device to perform verification, where the completion message used for generating the verification value is a completion message that does not include the verification value. After receiving the verification value, the first device generates a verification value using an Authkey generated by the first device, an M2 message, and a completion message, and compares the generated verification value with the received verification value, where if the generated verification value is consistent with the received verification value, the verification succeeds, and the first device can interact with the second device using the shared key DHkeyB or a derivative key of the shared key subsequently.

In addition, in this embodiment, when acquiring the public key of the second device in step 201, the first device may also acquire a nonce Nonce2 of the second device; in this way, the second device may no longer add the Nonce2 in the M1 message sent to the first device, and in this case, step 205 may be performed after step 202.

Embodiment 3

Figure 3:
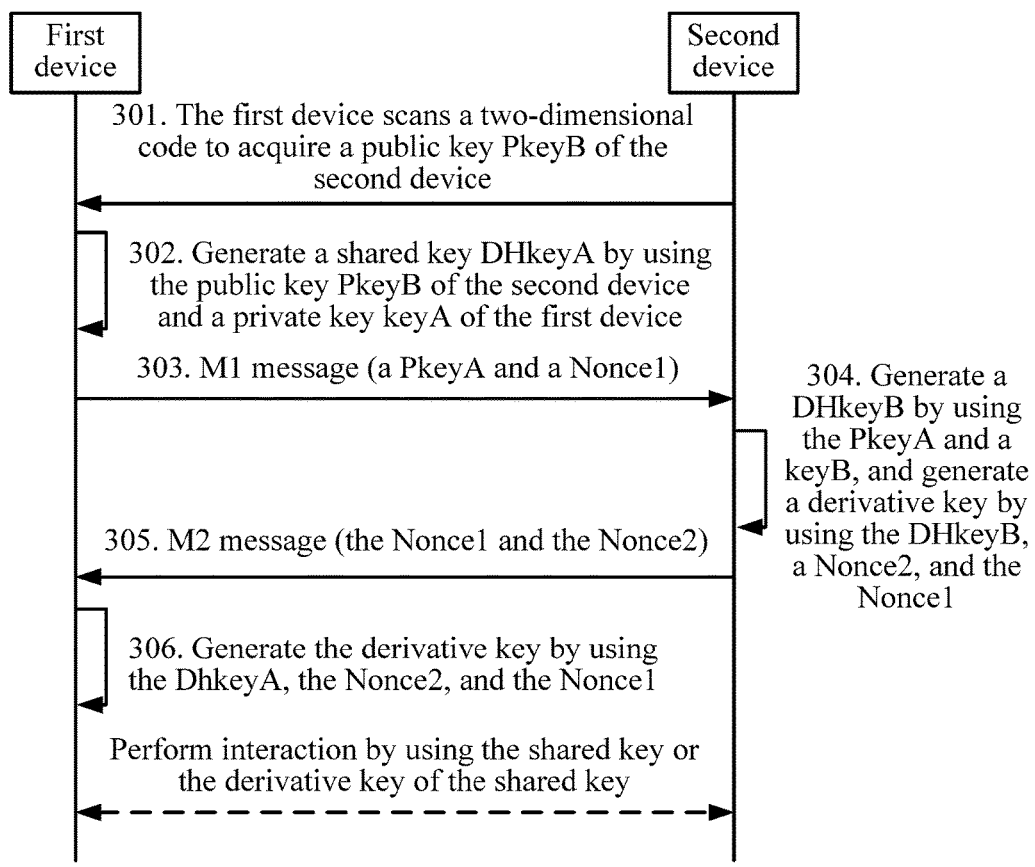
FIG. 3 is a schematic flowchart of a key configuration method according to Embodiment 3 of the present disclosure.

This embodiment still uses an example in which key configuration is applied in a WPS authentication procedure. A difference from Embodiment 2 lies in that in this embodiment, assuming that in the WPS authentication procedure, a first device is an enrollee, and a second device is a registrar, in view of requirements of WPS authentication, an M1 message must be sent from the enrollee. Based on this, a procedure of a key configuration method provided in Embodiment 3 of the present disclosure is shown in FIG. 3, and includes the following steps.

Step 301 is the same as step 101.

Step 302 is the same as step 102.

Step 303: The first device sends an M1 message to the second device, where the M1 message includes at least a public key PkeyA of the first device and a nonce Nonce1 that is generated by the first device, and may further include a version number, device information of the first device, and the like.

Step 304: The second device generates a shared key DHkeyB using the public key PkeyA of the first device and a private key keyB of the second device, and generates a derivative key using the DHkeyB, a nonce Nonce2 of the second device, and the nonce Nonce1 that is generated by the first device.

A manner of generating a derivative key is the same as that described in Embodiment 2, and no further details are provided herein again.

Step 305: The second device sends an M2 message to the first device, where the M2 message includes the Nonce2 and the Nonce1.

In addition, the second device may further generate a verification value using the M1 message and the M2 message in combination with an Authkey, for example, generate a hash value, so that the first device performs verification. If the verification value is sent using the M2 message, the M2 message used for generating the verification value is an M2 message that does not include the verification value.

Step 306: The first device generates a derivative key using DHkeyA, the Nonce2, and the Nonce1.

If the first device receives the verification value, the first device also generates a verification value using the M1 message and the M2 message (that is, the M2 message that does not include the verification value) in combination with the derivative key that is obtained through calculation, and compares the generated verification value with the received verification value, where if the generated verification value is consistent with the received verification value, the verification succeeds, and the first device can interact with the second device using the shared key DHkeyB subsequently.

The first device may further generate a verification value using the Authkey generated by the first device, the M2 message, and a completion message, and send, using a completion message, the verification value to the second device to perform verification, where the completion message used for generating the verification value is a completion message that does not include the verification value. After receiving the verification value, the second device generates a verification value using an Authkey generated by the second device, the M2 message, and a completion message, and compares the generated verification value with the received verification value, where if the generated verification value is consistent with the received verification value, the verification succeeds, and the second device can interact with the first device using the shared key DHkeyB or a derivative key of the shared key subsequently.

In addition, in this embodiment, when acquiring the public key of the second device in step 301, the first device may also acquire a nonce Nonce2 of the second device; in this way, the second device may no longer add Nonce2 in the M2 message sent to the first device, and in this case, step 306 may be performed after step 302.

Embodiment 4

Figure 4:
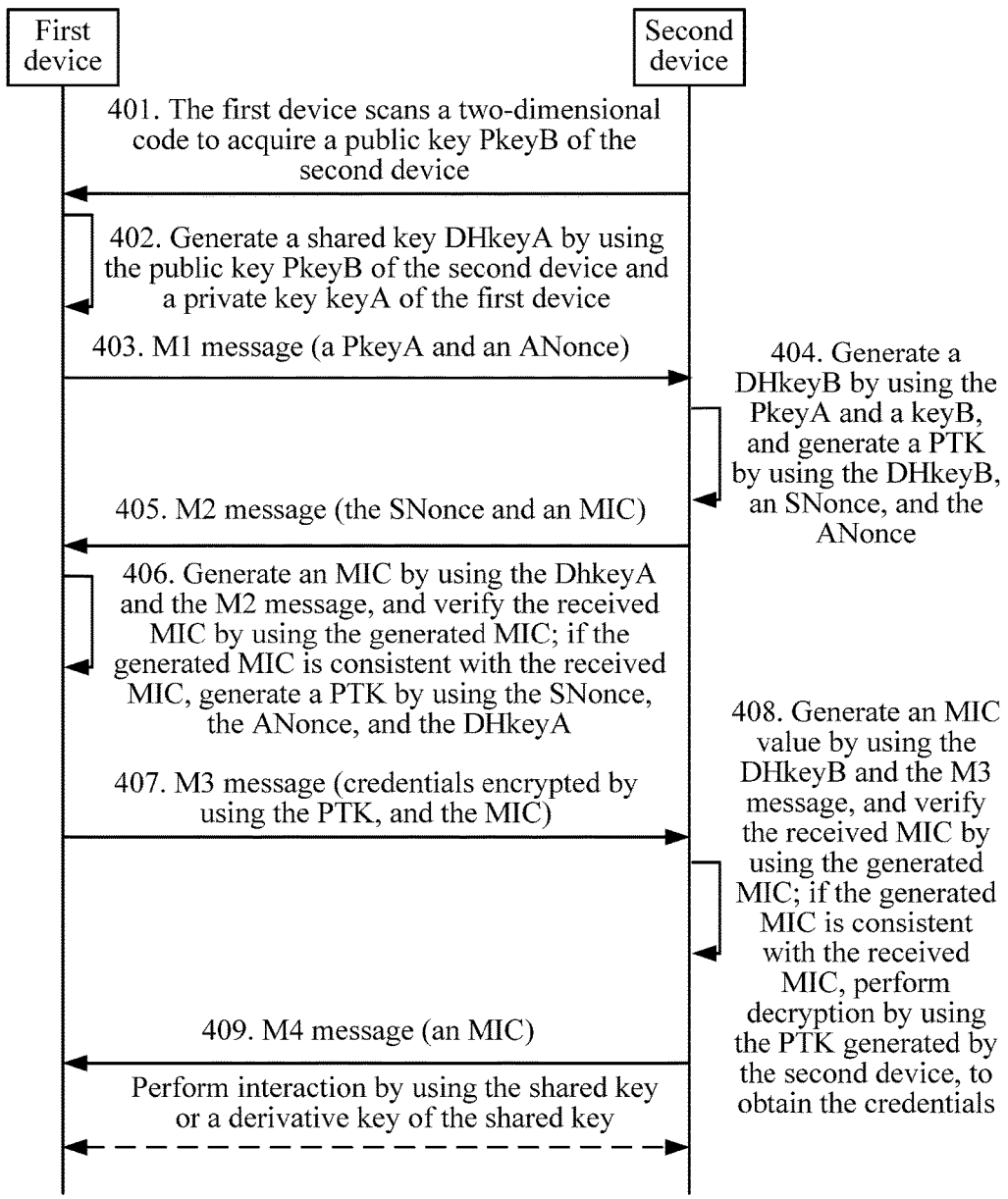
FIG. 4 is a schematic flowchart of a key configuration method according to Embodiment 4 of the present disclosure.

This embodiment uses an example in which key configuration is applied in a four-way handshake procedure. Assuming that in the four-way handshake process a first device is an Authenticator (authenticator), and a second device is used as a supplicant (applicant), in the four-way handshake procedure, an M1 message must be sent by the Authenticator. Based on this, a key configuration method provided in Embodiment 4 of the present disclosure is shown in FIG. 4, and includes the following steps.

Step 401 is the same as step 101.

Step 402 is the same as step 102.

Step 403: The first device sends an M1 message to the second device, where the M1 message includes a public key PkeyA of the first device and a random number ANonce (an AP random value) that is generated by the first device.

Step 404: The second device generates a shared key DHkeyB using the PkeyA and a private key keyB of the second device, and generates a pairwise transient key (PTK) using a random number SNonce (a site random value) generated by the second device, the DHkeyB, and the ANonce.

When generating the PTK, the SNonce, the ANonce, and a derivative key of the DHkeyB may also be used. An existing manner may be used for generating the PTK, which is not limited herein.

Step 405: The second device sends an M2 message to the first device, where the M2 message includes the SNonce and an message integrity code (MIC) of the M2 message.

The MIC of the M2 message may be a hash value that is obtained by performing hash on the DHkeyB or the derivative key of the DHkeyB with reference to the M2 message, or a hash value that is obtained by performing hash on a derivative key of the PTK with reference to the M2 message, and is mainly used for checking integrity of the message.

Step 406: The first device generates an MIC using the DHkeyA and the M2 message, and verifies the received MIC using the generated MIC; if the generated MIC is consistent with the received MIC, generates the PTK using the SNonce, the ANonce, and the DHkeyA (or a verification key of the DHkeyA).

If the MIC in step 405 is generated using the derivative key of the DHkeyB and the M2 message, the MIC in step 406 is generated using the derivative key of the DHkeyA and the M2 message; if the MIC in step 405 is generated using the derivative key of the PTK and the M2 message, in step 406, the PTK may be generated first, and the MIC is generated using the derivative key of the PTK and the M2 message, and the generated MIC is used to verify the received MIC. Certainly, in any case, the PTK may be generated first, and then, the MIC is generated for verification.

Step 407: The first device encrypts credentials using the PTK, and sends encrypted credentials, and an MIC value of an M3 message to the second device.

The MIC value is generated after hash is performed using the DHkeyA and the M3 message.

Step 408: The second device generates an MIC value using the DHkeyB and the M3 message, and verifies the received MIC using the generated MIC value; if the verification succeeds, performs decryption using the PTK generated by the second device, to obtain the credentials.

Step 409: The second device sends an M4 message and an MIC of the message to the first device to perform verification.

Till now, four-way handshake between the first device and the second device is completed. Actually, in step 404, sharing of the shared key is completed, and the first device and the second device can perform subsequent interaction using the shared key or the derivative key of the shared key.

Subsequent step 405 and step 409 are inherent procedures of the four-way handshake, and the shared key is used only in the interaction process.

Embodiment 5

Figure 5:
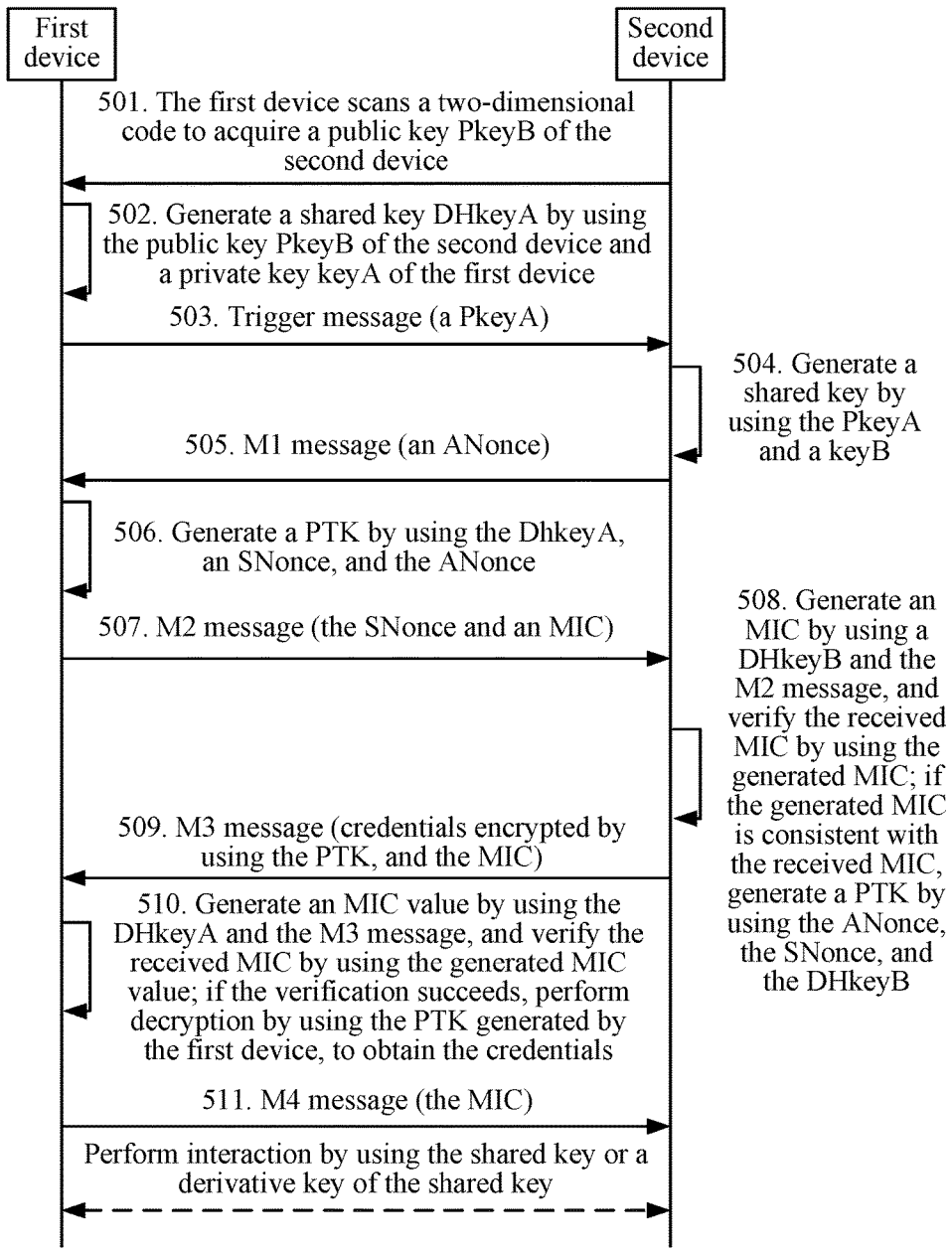
FIG. 5 is a schematic flowchart of a key configuration method according to Embodiment 5 of the present disclosure.

This embodiment still uses an example in which key configuration is applied in a four-way handshake procedure. Assuming that in the four-way handshake procedure, a first device is a supplicant, and a second device is used as an Authenticator, in the four-way handshake procedure, an M1 message must be sent by the Authenticator. Based on this, a key configuration method provided in Embodiment 5 of the present disclosure is shown in FIG. 5, and includes the following steps.

Step 501 is the same as step 401.

Step 502 is the same as step 402.

Step 503: The first device sends a trigger message to the second device, where the trigger message includes a public key PkeyA of the first device, and instructs the second device to start a four-way handshake process.

Step 504: The second device generates a shared key using the PkeyA and a private key keyB of the second device.

Step 505: The second device sends an M1 message to the first device, where the M1 message includes a random number ANonce generated by the second device.

Step 506: The first device generates a PTK using the ANonce, and a SNonce and a DHkeyA that are generated by the first device.

Step 507: The first device sends the SNonce and an MIC of an M2 message to the second device using the M2 message.

The MIC of the M2 message may be a hash value that is obtained by performing hash on the DHkeyB or a derivative key of the DHkeyB with reference to the M2 message, or a hash value that is obtained by performing hash on a derivative message of the PTK with reference to the M2 message, and is mainly used for checking integrity of the message.

Step 508: The second device generates an MIC using the DHkeyB and the M2 message, and verifies the received MIC using the generated MIC; if the generated MIC is consistent with the received MIC, generates the PTK using the ANonce, the SNonce, and the DHkeyB.

If the MIC is generated using the derivative key of the DHkeyA and the M2 message in step 507, in step 508, the MIC is generated using the derivative key of the DHkeyB and the M2 message, and then is verified. If the MIC is generated using the derivative key of the PTK and the M2 message in step 507, in step 508, the PTK is generated first, and the MIC is generated using the derivative key of the PTK and the M2 message, and then is verified. Certainly, in any case, the PTK may be generated first, and then, the MIC is generated for verification.

Step 509: The second device encrypts credentials using the PTK, and sends encrypted credentials, and an MIC value of an M3 message to the first device, where the MIC value of the M3 message is generated using the DHkeyB and the M3 message.

Step 510: The first device generates the MIC value using the DHkeyA and the M3 message, and verifies the received MIC using the generated MIC value; if the verification succeeds, performs decryption using the PTK generated by the second device, to obtain the credentials.

Step 511: The first device sends an M4 message and an MIC of the message to the second device to perform verification.

Till now, four-way handshake between the first device and the second device is completed. Actually, in step 504, sharing of the shared key is completed, and the first device and the second device can perform subsequent interaction using the shared key. Subsequent step 505 and step 511 are inherent procedures of the four-way handshake, and the shared key is used only in the interaction process.

In the procedures described in Embodiment 1 to Embodiment 5, the first device and the second device perform subsequent interaction process using the shared key. Besides, after both the first device and the second device generate the shared key, one party may encrypt a password using the generated shared key or a derivative key of the shared key and send the encrypted password to the other party, where the password may be credentials, a session key, or the like, and may be generated randomly, or may be generated according to an algorithm, which is not limited herein. The other party performs decryption using the shared key generated by the other party or a derivative key of the shared key, to obtain the password, and then both parties can perform a subsequent interaction process using the password or a derivative key of the password.

Embodiment 6

Figure 6:
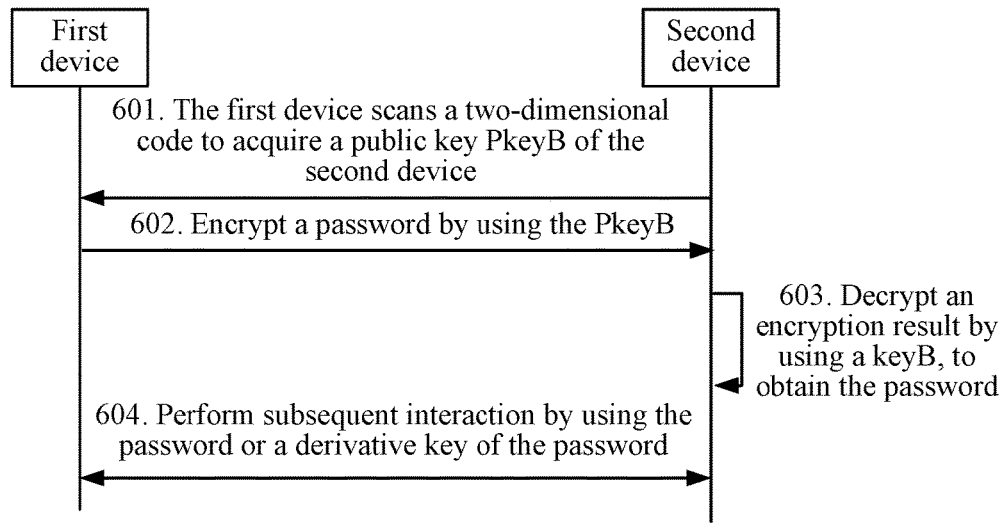
FIG. 6 is a schematic flowchart of a key configuration method according to Embodiment 6 of the present disclosure.

In this embodiment, key configuration is not performed using a key exchange manner. In this embodiment, there are a pair of public and private keys for each of a first device and a second device, that is, the first device has a public key PkeyA and a private key keyA, and the second device has a public key PkeyB and a private key keyB, and a manner of generating the public and private keys is not specifically limited herein, and is characterized in that a result obtained through encryption using the public key PkeyA can be decrypted using the private key keyA, and a result obtained through encryption using the public key PkeyB can be decrypted using the private key keyB. FIG. 6 is a schematic flowchart of a key configuration method according to Embodiment 6 of the present disclosure. As shown in FIG. 6, the method includes the following steps.

Step 601 is the same as step 101.

If the first device is a registrar, an AP, a GO, or a central node, a procedure of step 602 to step 604 is performed.

Step 602: The first device encrypts a password using the public key PkeyB of the second device, and sends an encryption result to the second device, where the password may be credentials, a session key, or the like, and may be generated randomly, or may be generated according to an algorithm, which is not limited herein.

Encryption manner 1 described in Embodiment 1 may be used as an encryption manner in this step.

Further, the first device may generate a verification value using the public key PkeyB of the second device, for example, generate a hash value of the PkeyB and send the hash value to the second device. After receiving the verification value, the second device first generates a verification value using the public key PkeyB of the second device, compares the generated verification value with the received verification value, and if the generated verification value is consistent with the received verification value, determines that the verification succeeds, and continues to perform step 603.

Step 603: The second device decrypts the encryption result using the private key keyB of the second device, to obtain the password.

Step 604: The first device and the second device perform subsequent interaction using the password or a derivative key of the password.

This embodiment uses an example in which the first device is a registrar, an AP, a GO, or a central node. If the second device is a registrar, an AP, a GO, or a central node, a procedure shown in Embodiment 7 is performed.

Embodiment 7

Figure 7:
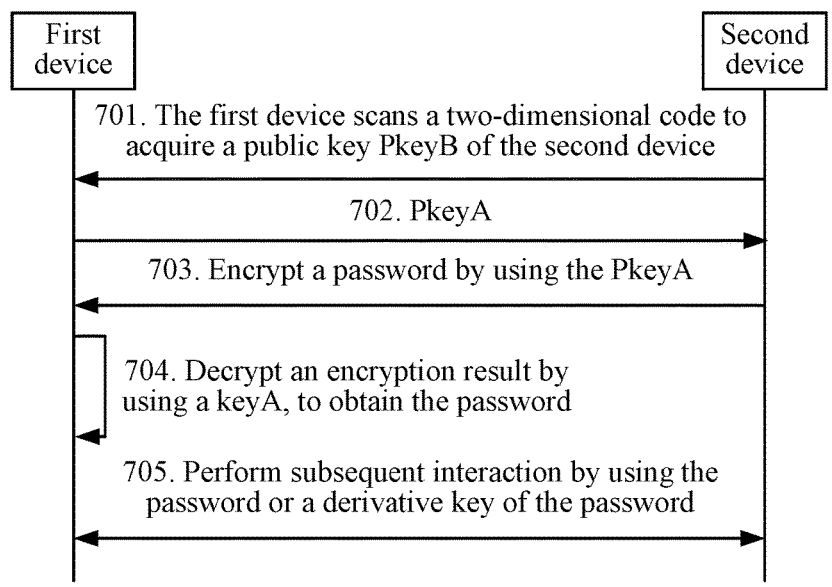
FIG. 7 is a schematic flowchart of a key configuration method according to Embodiment 7 of the present disclosure.

FIG. 7 is a schematic flowchart of a key configuration method according to Embodiment 7 of the present disclosure. As shown in FIG. 7, the method includes the following steps.

Step 701 is the same as step 101.

Step 702: The first device sends a public key PkeyA of the first device to the second device.

Herein, to improve security, the first device may encrypt the PkeyA using the public key PkeyB of the second device, and send an encrypted PkeyA to the second device, and the second device performs decryption using a private key keyB of the second device, to obtain the PkeyA.

Encryption manner 1 described in Embodiment 1 may be used as an encryption manner herein.

Step 703: The second device encrypts a password using the public key PkeyA of the first device, and sends an encryption result to the first device, where the password may be credentials, a session key, or the like, and may be generated randomly, or may be generated according to an algorithm, which is not limited herein.

Encryption manner 1 described in Embodiment 1 may be used as the encryption manner herein.

Further, the second device may generate a verification value using the public key PkeyA of the first device, for example, generate a hash value of the PkeyA and send the hash value to the first device. After receiving the verification value, the first device first generates a verification value using the public key PkeyA of the first device, compares the generated verification value with the received verification value, and if the generated verification value is consistent with the received verification value, determines that the verification succeeds, and continues to perform step 704.

Step 704: The first device decrypts the encryption result using a private key keyA of the first device, to obtain the password.

Step 705: The first device and the second device perform subsequent interaction using the password or a derivative key of the password.

If roles or types of the first device and the second device are consistent, for example, both the first device and the second device are wireless terminal devices, or enrollees, either the manner in Embodiment 6 or the manner in Embodiment 7 is suitable.

Information used for obtaining a shared key in Embodiment 6 is a password generated by the first device, and information used for obtaining a shared key in Embodiment 7 is a public key of the first device.

It should be noted that, both manners shown in Embodiment 6 and Embodiment 7 are suitable for the WPS authentication procedure or the four-way handshake procedure, as long as the shared key involved in the WPS authentication procedure or the four-way handshake procedure is replaced with the password in Embodiment 6 or Embodiment 7, and no further details are provided herein again.

Figure 8:
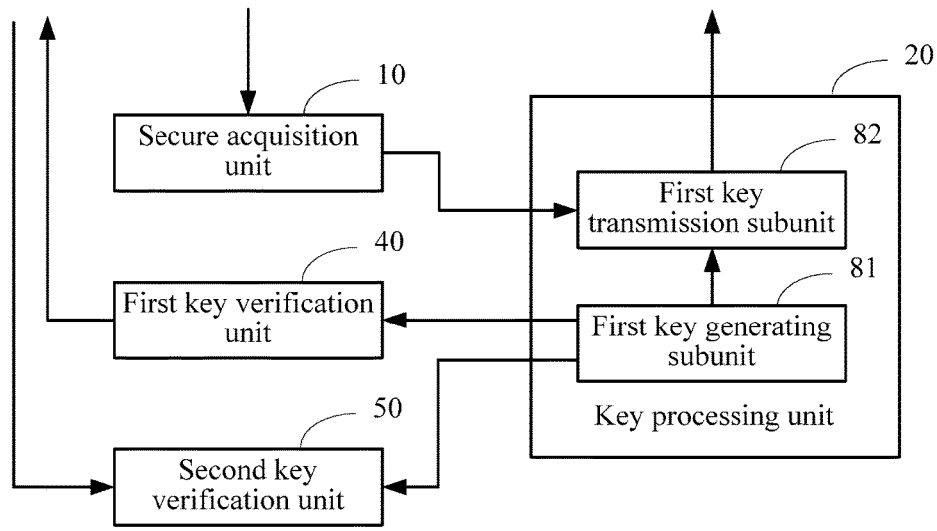
FIG. 8 is a schematic structural diagram of a key configuration apparatus located in a first device according to an embodiment of the present disclosure.

The foregoing describes in detail the method provided in the present disclosure. In a system formed by a first device and a second device, the following respectively describes in detail the first device and the second device. FIG. 8 is a structural diagram of a key configuration apparatus according to an embodiment of the present disclosure. The key configuration apparatus is located in a first device, and mainly includes a secure acquisition unit 10 and a key processing unit 20.

The secure acquisition unit 10 is configured to acquire a public key of a second device through a secure medium.

The secure acquisition unit 10 may acquire the public key of the second device from the second device in a manner, where the manner includes but is not limited to a manner of scanning an identifier, in a manner of using a USB, or by means of NFC. Using an example in which a manner of scanning an identifier is used, the secure acquisition unit 10 scans an identifier of the second device, where the identifier may be a two-dimensional code, a barcode, or the like. The identifier includes the public key PkeyB of the second device, and may further include device information of the second device, where the device information is mainly address information, and may further include but not limited to the following device information: a UUID, a manufacturer, a serial number, a device capability, and channel information. The device capability refers to an algorithm, an authentication method, device role information, device type information, and the like that are supported by the device, where the device role information refers to a role of the device during registration, and may be an enrollee, a registrar, a client, a GO, or the like. The device type information may be a wireless terminal (such as a Wifi terminal, a Bluetooth terminal, or a Zigbee terminal), an AP (which is an AP in a Wifi network, or may be a Bluetooth gateway in a Bluetooth network, an Internet of things gateway in a Zigbee network, or the like), a sensor node, a central node, or the like.

The key processing unit 20 is configured to send information used for obtaining a shared key to the second device, and obtain a shared key using the information used for obtaining a shared key or using a private key of the first device.

In this way, the second device can obtain a shared key using a private key of the second device and the information that is used for obtaining a shared key.

The first device and the second device may configure a shared key in a key exchange manner, or may not configure a shared key in a key exchange manner; therefore, correspondingly, the key processing unit 20 may use the following two manners for implementation.

Implementation manner 1: A key exchange manner is not used, where this manner corresponds to content described in Embodiment 6 and Embodiment 7, and in this case, the key processing unit 20 may have two structures.

Structure 1: As shown in FIG. 8, the key processing unit 20 may include a first key generating subunit 81 and a first key transmission subunit 82.

The first key generating subunit 81 is configured to generate a password, and use the password as the shared key, where the password may be credentials, a session key, or the like, and may be generated randomly, or may be generated according to an algorithm, which is not limited herein.

The first key transmission subunit 82 is configured to, after the password is encrypted using the public key of the second device, send an encryption result to the second device, so that the second device decrypts the encryption result using the private key of the second device, to obtain the password, and uses the password as the shared key.

Figure 9:
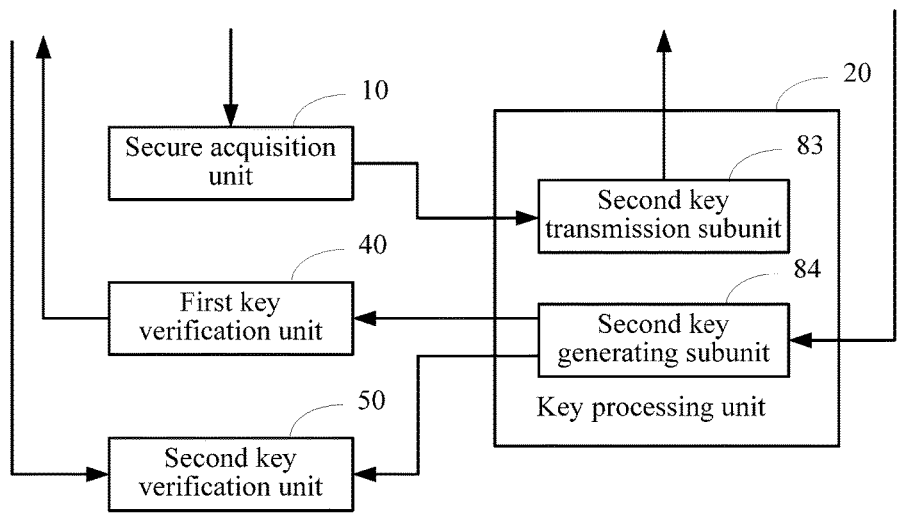
FIG. 9 is a schematic structural diagram of a second key configuration apparatus located in a first device according to an embodiment of the present disclosure.

Structure 2: As shown in FIG. 9, the key processing unit 20 may include a second key transmission subunit 83 and a second key generating subunit 84.

The second key transmission subunit 83 is configured to, after the public key of the first device is encrypted using the public key of the second device, send an encryption result to the second device.

In this way, after receiving the decryption result, the second device decrypts the encryption result using the private key of the second device, to obtain the public key of the first device, generates a password, and uses the password as the shared key; then, after encrypting the password using the public key of the first device, sends an encryption result to the first device.

In this way, the second key generating subunit 84 decrypts, after the encryption result sent by the second device is received, the encryption result using the private key of the first device, and use the obtained password as the shared key.

Figure 10:
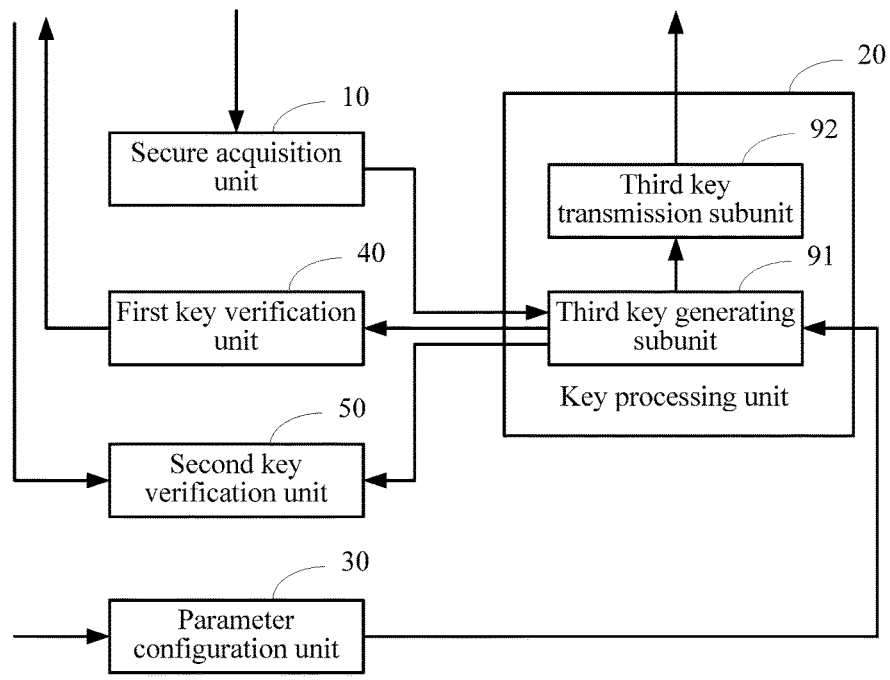
FIG. 10 is a schematic structural diagram of a third key configuration apparatus located in a first device according to an embodiment of the present disclosure.

Implementation manner 2: A key exchange manner is used. The first device and the second device predetermine a key exchange algorithm, and in this case, as shown in FIG. 10, the key processing unit 20 includes a third key generating subunit 91 and a third key transmission subunit 92.

The third key generating subunit 91 is configured to generate a shared key using the public key of the second device and the private key of the first device according to the key exchange algorithm. In this embodiment of the present disclosure, the shared key algorithm may be but not limited to a D-H algorithm, an RSA algorithm, or an ElGamal algorithm. Using the D-H algorithm as an example, the shared key DHKeyA=((PkeyB)^keyA)mod(P), where the PkeyB is the public key of the second device, the keyA is the private key of the first device, and P is a pre-shared parameter used by the key exchange algorithm.

The third key transmission subunit 92 is configured to send the public key of the first device to the second device, so that the second device generates the shared key using the public key of the first device and the private key of the second device according to the key exchange algorithm. Similarly, the shared key DHkeyB=((PkeyA)^keyB)mod(P), where the PkeyA is the public key of the first device, the keyB is the private key of the second device, and as can be known from the D-H algorithm, DHkeyA=DHkeyB.

In this manner, the apparatus may further include a parameter configuration unit 30 configured to store a pre-configured parameter used by the key exchange algorithm, or receive and store a parameter used by the key exchange algorithm and sent by a third-party configuration device. That is, the parameter used by the key exchange algorithm may be pre-shared in two manners: a first manner is a preconfiguration manner, that is, a static configuration manner, and a second manner is a manner of sending a parameter by a third-party configuration device.

The first device and the second device perform secure interaction using the shared key. Besides, in Implementation manner 2, the third key generating subunit 92 may be further configured to, after generating the shared key, encrypt a password using the shared key or a derivative key of the shared key, and the third key transmission subunit 91 is further configured to send an encryption result generated by the third key generating subunit 92 to the second device, so that the second device performs decryption using the shared key generated by the second device, to obtain the password. In this case, the first device and the second device can perform a subsequent secure connection using the password, where the password herein may be credentials, a session key, or the like. Alternatively, The second device encrypts a password using the shared key generated by the second device, and sends the password to the first device. In this case, the third key transmission subunit 91 receives an encryption result sent by the second device. The third key generating subunit 92 decrypts, using the generated shared key, the encryption result received by the third key transmission subunit 91, to obtain the password (this case is not shown in the figure). In this case, the first device and the second device can perform a subsequent secure connection using the password, where the password herein may be credentials, a session key, or the like.

In addition, in Implementation manner 2, to improve security of interaction, when sending the public key of the first device to the second device, the second key transmission subunit 92 may encrypt the public key of the first device using the public key of the second device, and send an encryption result to the second device, so that the second device decrypts the encryption result, to obtain the public key of the first device. Implementation manner 2 corresponds to content described in Embodiment 1.

Based on the foregoing two implementation manners, because the secure acquisition unit 10 can acquire the device information of the second device through the secure medium, where the device information may include address information of the second device, the key processing unit 20 may send the information used for obtaining a shared key to the second device according to the address information of the second device.

Based on the foregoing two implementation manners, the apparatus may further include a first verification unit 40 configured to, after the key processing unit 20 generates the shared key, generate a verification value using at least one of the shared key, a derivative key of the shared key, and plaintext that is pre-agreed between the first device and the second device, and send the verification value to the second device.

After receiving the verification value, the second device generates a verification value using at least one of the generated shared key DHkeyA, a derivative key of the DHkeyA, and the plaintext that is pre-agreed between the second device and the first device, and compares the verification value with the received verification value, where if the generated verification value is consistent with the received verification value, the verification succeeds, and the second device can interact with the first device using the shared key subsequently.

Based on the foregoing two implementation manners, because the first device may receive the verification value sent by the second device, the apparatus may further include a second key verification unit 50 configured to, after the verification value sent by the second device is received, generate a verification value using at least one of the shared key generated by the key processing unit 20, a derivative key of the shared key, and the plaintext that is pre-agreed between the first device and the second device, and compare the generated verification value with the received verification value, where if the generated verification value is consistent with the received verification value, the verification succeeds, and the first device can interact with the second device using the shared key or the derivative key of the shared key subsequently.

The key configuration manner may be well applied in a WPS authentication process and a four-way handshake process. When the key configuration manner is applied in the WPS authentication process, the key processing unit 20 may send, using the first message (that is, an M1 message) generated in the WPS authentication process, the information used for obtaining a shared key; or the first device sends, to the second device, a trigger message used for instructing the second device to start a WPS authentication process, and the key processing unit 20 sends, using the second message (that is, an M2 message) generated in the WPS authentication process, the information used for obtaining a shared key. For details, refer to content described in Embodiment 2 and Embodiment 3.

When the key configuration manner is applied in the four-way handshake process, the key processing unit 20 may send, using the first message (that is, an M1 message) generated in the four-way handshake process, the information used for obtaining a shared key; or send, using a trigger message used for instructing the second device to start a four-way handshake process, the information used for obtaining a shared key. For details, refer to content described in Embodiment 4 and Embodiment 5.

In the WPS authentication process and the four-way handshake process, a specific message used for sending the information used for obtaining a shared key is related to a role of the first device. For details, refer to the content described in Embodiment 2 to Embodiment 5, and no further details are provided herein.

Figure 11:
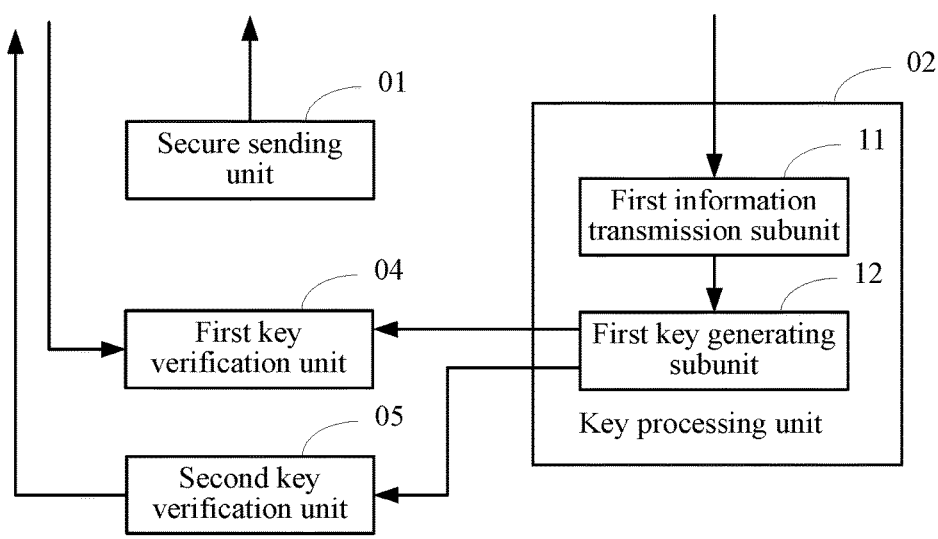
FIG. 11 is a schematic structural diagram of a key configuration apparatus located in a second device according to an embodiment of the present disclosure.

FIG. 11 is a schematic structural diagram of a key configuration apparatus according to an embodiment of the present disclosure. The key configuration apparatus is located in a second device, and as shown in FIG. 11, the apparatus includes a secure sending unit 01 and a key processing unit 02.

The secure sending unit 01 is configured to provide a public key of the second device to a first device through a secure medium. The secure sending unit 01 may provide the public key of the second device to the first device in a manner of providing an identifier to the first device to perform scanning, in a manner of using a USB, or by means of NFC. Using an example in which a manner of providing an identifier to the first device to perform scanning is used, an identifier is set on the second device, where the identifier may be a two-dimensional code, a barcode, or the like. The identifier includes the public key PkeyB of the second device, and may further include device information of the second device, where the device information is mainly address information, and may further include but not limited to the following device information: a UUID, a manufacturer, a serial number, a device capability, and channel information. The device capability refers to an algorithm, an authentication method, device role information, device type information, and the like that are supported by the device, where the device role information refers to a role of the device during registration, and may be an enrollee, a registrar, a client, a GO, or the like. The device type information may be a wireless terminal (such as a Wifi terminal, a Bluetooth terminal, or a Zigbee terminal), an AP (which is an AP in a Wifi network, or may be a Bluetooth gateway in a Bluetooth network, an Internet of things gateway in a Zigbee network, or the like), a sensor node, a central node, or the like.

The key processing unit 02 is configured to obtain a shared key using a private key of the second device and information that is used for obtaining a shared key and is sent by the first device.

According to a manner in which the first device sends the information used for obtaining a shared key, the key processing unit 02 may use the following two manners for implementation.

Implementation manner 1: A key exchange manner is not used, and in this case, the key processing unit 02 may have the following two structures.

Structure 1: As shown in FIG. 11, the key processing unit 02 may include a first information transmission subunit 11 and a first key generating subunit 12.

The first information transmission subunit 11 is configured to receive an encryption result that is obtained after the first device encrypts, using the public key of the second device, a password generated by the first device; and the first key generating subunit 12 is configured to decrypt the encryption result using the private key of the second device, to obtain the password, and use the password as the shared key. Implementation manner 1 corresponds to content described in Embodiment 6.

Figure 12:
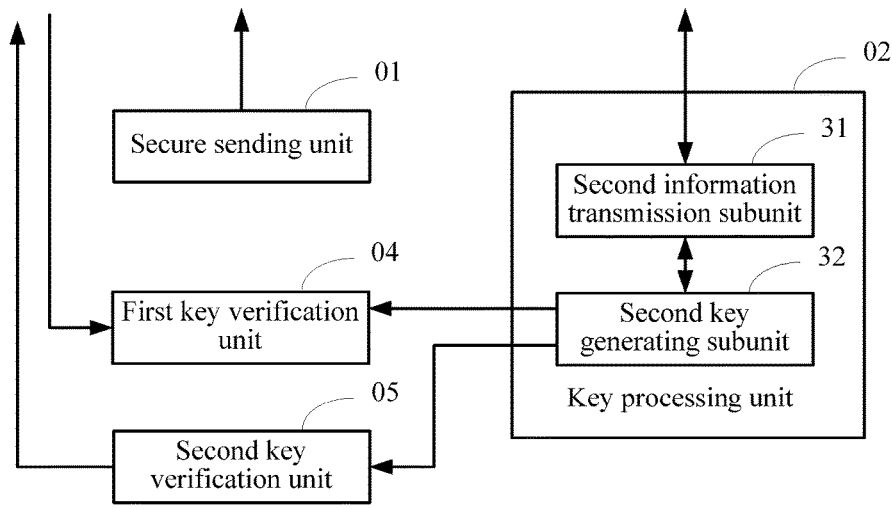
FIG. 12 is a schematic structural diagram of a second key configuration apparatus located in a second device according to an embodiment of the present disclosure.

Structure 2: As shown in FIG. 12, the key processing unit 02 may include a second information transmission subunit 31 and a second key generating subunit 32.

The second information transmission subunit 31 is configured to receive an encryption result that is obtained after the first device encrypts a public key of the first device using the public key of the second device, and send an encryption result obtained by the second key generating subunit 32 to the first device, so that the first device decrypts the received encryption result using a private key of the first device, and uses an obtained password as the shared key.

The second key generating subunit 32 is configured to decrypt, using the private key of the second device, the encryption result received by the second information transmission subunit, to obtain the public key of the first device, generate a password, use the password as the shared key, and obtain an encryption result after encrypting the password using the public key of the first device.

Figure 13:
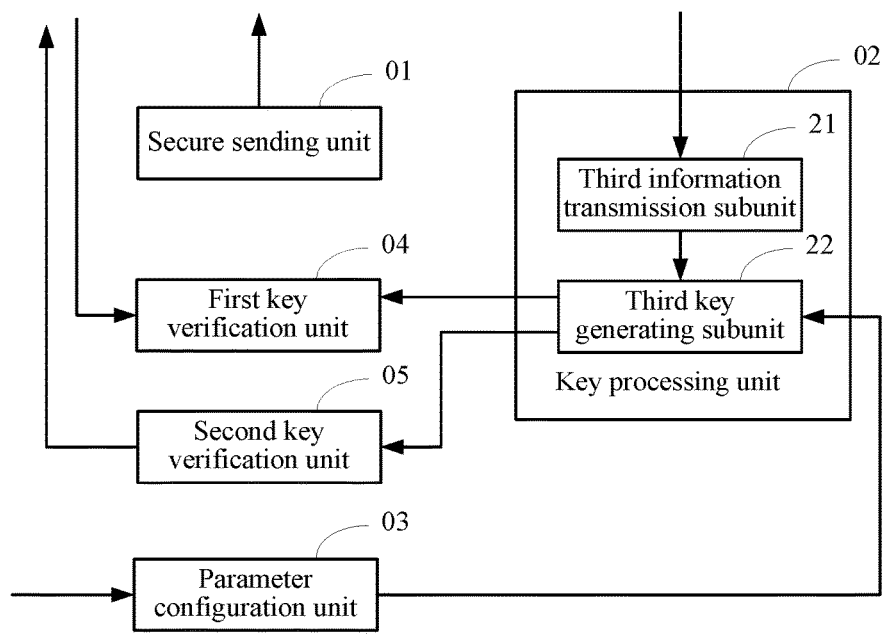
FIG. 13 is a schematic structural diagram of a third key configuration apparatus located in a second device according to an embodiment of the present disclosure.

Implementation manner 2: A key exchange manner is used, and in this manner, the first device and the second device predetermine a key exchange algorithm, and in this case, the information used for obtaining a shared key is a public key of the first device. In this manner, as shown in FIG. 13, the key processing unit 02 includes a third information transmission subunit 21 and a third key generating subunit 22.

The third information transmission subunit 21 is configured to receive the public key of the first device sent by the first device, and the third key generating subunit 22 is configured to generate a shared key using the public key of the first device and the private key of the second device according to the key exchange algorithm. In this embodiment of the present disclosure, the shared key algorithm may be but not limited to a D-H algorithm, an RSA algorithm, and an ElGamal algorithm. Using the D-H algorithm as an example, the shared key $DHKeyB=((PkeyA)^{keyB})mod(P)$, where the PkeyA is the public key of the first device, the keyB is the private key of the second device, and P is a pre-shared parameter used by the key exchange algorithm.

In this manner, the apparatus may further include a parameter configuration unit 03 configured to store a preconfigured parameter used by the key exchange algorithm, or receive and store a parameter used by the key exchange algorithm and sent by a third-party configuration device. That is, the parameter used by the key exchange algorithm may be pre-shared in two manners: a first manner is a preconfiguration manner, that is, a static configuration manner, and a second manner is a manner of sending a parameter by a third-party configuration device.

The first device and the second device perform a secure connection using the shared key. Besides, in Implementation manner 2, after receiving the shared key that is generated by the first device using the public key of the second device and the private key of the first device according to the key exchange algorithm, the third information transmission subunit 21 may further encrypt a password using the shared key or a derivative key of the shared key, to obtain an encryption result; the third key generating subunit 22 decrypts, using the shared key generated by the third key generating subunit 22, the encryption result received by the third information transmission subunit 21, to obtain the password. The first device and the second device can perform a secure connection using the password subsequently, where the password herein may be credentials, a session key, or the like.

Alternatively, after generating the shared key, the third key generating subunit 22 encrypts a password using the shared key or a derivative key of the shared key, to obtain an encryption result. The third information transmission subunit 21 sends the encryption result generated by the third key generating subunit 22 to the first device, so that the first device performs decryption using the shared key, to obtain the password (this case is not shown in the figure); subsequently, the first device and the second device can perform secure interaction using the password, where the password may be credentials, a session key, or the like.

In addition, in Implementation manner 2, to improve security of interaction, the third information transmission subunit 21 is further configured to receive an encryption result that is sent by the first device and is obtained after the first device encrypts the public key of the first device using the public key of the second device, and decrypt the encryption result, to obtain the public key of the first device. Manner 2 corresponds to content described in Embodiment 1.

Based on the foregoing two implementation manners, the apparatus may further include a first key verification unit 04 configured to, after a verification value sent by the second device is received, generate a verification value using at least one of the shared key generated by the key processing unit 02, a derivative key of the shared key, and the plaintext that is pre-agreed between the second device and the first device, and compare the generated verification value with the received verification value, where if the generated verification value is consistent with the received verification value, the verification succeeds, and the second device can interact with the first device using the shared key or the derivative key of the shared key subsequently.

Based on the foregoing two implementation manners, because the second device may send the verification value to the first device, the apparatus may further include a second key verification unit 05 configured to, after the key processing unit 02 generates the shared key, generate a verification value using at least one of the shared key, a derivative key of the shared key, and the plaintext that is pre-agreed between the second device and the first device, and send the verification value to the first device.

The key configuration manner may be well applied in the WPS authentication process and the four-way handshake process. When the key configuration manner is applied in the WPS authentication process, the key processing unit 02 may acquire, using the first message generated in the WPS authentication process, the information used for obtaining a shared key; or acquire, using the second message generated in the WPS authentication process, the information used for obtaining a shared key. For details, refer to content described in Embodiment 2 and Embodiment 3.

When the key configuration manner is applied in the four-way handshake process, the key processing unit 02 may acquire, using the first message generated in the four-way handshake process, the information used for obtaining a shared key; or acquire, using a trigger message used for instructing the second device to start the four-way handshake process, the information used for obtaining a shared key. For details, refer to content described in Embodiment 4 and Embodiment 5.

The first device and the second device each may be a personal computer, a notebook computer, a wireless phone, a PDA, a sensor node, an AP, or the like. It should be noted that, the method and apparatus provided in the present disclosure are not limited to a WiFi network, may be applied in any wireless network such as Bluetooth, or Zigbee, and even may be applied in key configuration in a wired network.

Figure 14:
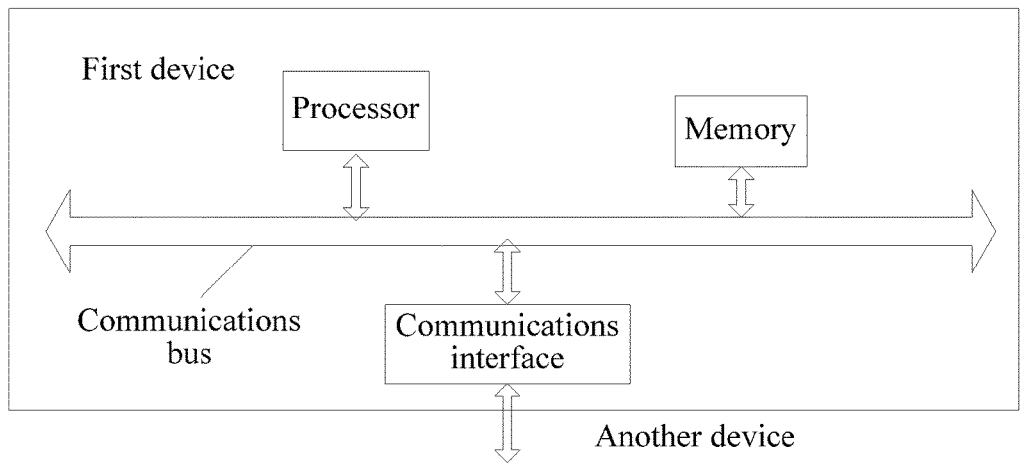
FIG. 14 is a schematic structural diagram of hardware of a first device according to an embodiment of the present disclosure.

As shown in FIG. 14, the first device includes a processor, a memory, and a communications bus. The processor is connected to the memory using the communications bus. The memory saves an instruction used for implementing a key configuration method. Further, the first device further includes a communications interface, and is in communication connection with another device through the communications interface.

When the processor invokes the instruction stored in the memory and used for implementing a key configuration method, the following steps may be performed: acquiring a public key of a second device through a secure medium; sending information used for obtaining a shared key to the second device, so that the second device obtains a shared key using a private key of the second device and the information that is used for obtaining a shared key; and obtaining the shared key using the information used for obtaining a shared key or using a private key of the first device.

When the processor invokes the instruction stored in the memory and used for implementing a key configuration method, the steps performed by the first device in the foregoing method embodiment may be performed. For details, reference may be made to the foregoing method embodiment, and no further details are provided herein again.

Figure 15:
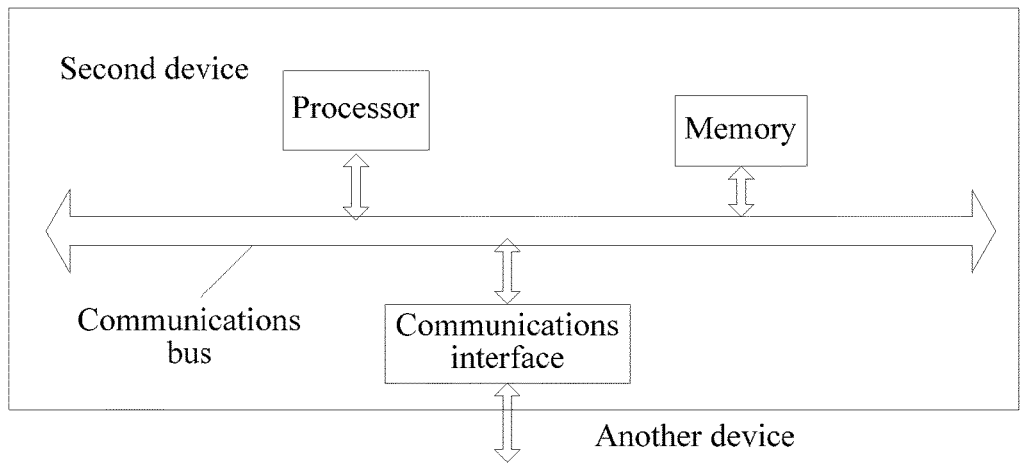
FIG. 15 is a schematic structural diagram of hardware of a second device according to an embodiment of the present disclosure.

In addition, as shown in FIG. 15, the second device includes a processor, a memory, and a communications bus. The processor is connected to the memory using the communications bus. The memory saves an instruction used for implementing a key configuration method. Further, the second device further includes a communications interface, and is in communication connection with another device through the communications interface.

When the processor invokes the instruction stored in the memory and used for implementing a key configuration method, the following steps may be performed: providing a public key of the second device to a first device through a secure medium; receiving information used for obtaining a shared key and sent by the first device; and obtaining a shared key using a private key of the second device and the information that is used for obtaining a shared key, where the first device obtains the shared key using the information used for obtaining a shared key or using a private key of the first device.

When the processor invokes the instruction stored in the memory and used for implementing a key configuration method, the steps performed by the second device in the foregoing method embodiment may be performed. For details, reference may be made to the foregoing method embodiment, and no further details are provided herein again.

The devices described in the present disclosure each include some basic components, such as a bus, a processing system, a storage system, one or more input/output systems, and a communications interface. The bus may include one or more conducting wires, to implement communication between components in the devices. The processing system includes various processors or microprocessors used for performing an instruction and processing a process or thread. The storage system may include a dynamic memory such as a random access memory (RAM) storing dynamic information, a static memory such as a read-only memory (ROM) storing static information, and a mass memory including a magnetic or optical record medium and a corresponding drive. An input system is used by a user to enter information to a server or a terminal device, such as a keyboard, a mouse, a stylus, a voice recognition system, or a biometric system. If the devices in the present disclosure are headless devices, the devices do not include an input system having a human computer interaction function. The output system may include a display, a printer, a loudspeaker, an indicator, and the like that are used for outputting information. The communications interface is used for enabling the server or the terminal device to communicate with another system or a system. The communications interface may be connected to a network through a wired connection, a wireless connection, or an optical connection.

Each device includes operating system software used for managing a system resource and controlling running of another program, and application software used for implementing a specific function.

The foregoing descriptions are merely exemplary embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A key configuration method, comprising:
   acquiring, by a first device, a public key of a second device through a secure medium;
   sending, by the first device, information used for obtaining a shared key to the second device, so that the second device obtains a shared key using a private key of the second device and the information that is used for obtaining the shared key, wherein the first device obtains the shared key using the information used for obtaining the shared key or using a private key of the first device, wherein the first device and the second device perform a secure connection using the shared key or a derivative key of the shared key, wherein acquiring, by the first device, the public key of the second device through the secure medium comprises acquiring, by the first device, the public key of the second device from the second device by one of scanning an identifier, using a Universal Serial Bus (USB), or using near field communication (NFC); and
   predetermining, by the first device and the second device, a key exchange algorithm,
   wherein the information used for obtaining the shared key is a public key of the first device,
   wherein obtaining, by the first device, the shared key using the private key of the first device comprises generating, by the first device, the shared key using the public key of the second device and the private key of the first device according to the key exchange algorithm,
   wherein obtaining, by the second device, the shared key using the private key of the second device and the information that is used for obtaining the shared key comprises generating, by the second device, the shared key using the public key of the first device and the private key of the second device according to the key exchange algorithm, and
   wherein predetermining, by the first device and the second device, the key exchange algorithm comprises at least one of:
      a preconfigured parameter, on the first device and the second device, used by the key exchange algorithm; and
      receiving, by the first device and the second device, a parameter used by the key exchange algorithm and sent by a third-party configuration device.

2. The method according to claim 1, wherein sending, by the first device, the information used for obtaining the shared key to the second device comprises sending, by the first device after encrypting the public key of the first device using the public key of the second device, an encryption result to the second device, so that the second device decrypts the encryption result, to obtain the public key of the first device.

3. The method according to claim 1, further comprising:
   generating, by the first device after obtaining the shared key, a first verification value using at least one of the shared key, the derivative key of the shared key, and plaintext that is pre-agreed between the first device and the second device;
   sending the first verification value to the second device so that the second device generates a second verification value using at least one of the shared key obtained by the second device, the derivative key of the shared key, and the plaintext that is pre-agreed between the second device and the first device; and
   verifying the generated second verification value with the received first verification value, wherein the verification succeeds when the first verification value is consistent with the second verification value, and wherein the second device performs a secure connection with the first device using the shared key or the derivative key of the shared key when the verification succeeds.

4. The method according to claim 1, further comprising:
   receiving, by the first device, a first verification value sent by the second device, wherein the first verification value is a verification value generated by the second device using at least one of the shared key, the derivative key of the shared key, and plaintext that is pre-agreed between the second device and the first device;
   generating, by the first device, a second verification value using at least one of the shared key obtained by the first device, the derivative key of the shared key, and the plaintext that is pre-agreed between the first device and the second device; and
   verifying the generated second verification value with the received first verification value, wherein the verification succeeds when the first verification value is consistent with the second verification value, and wherein the first device performs a secure connection with the second device using the shared key or the derivative key of the shared key when the verification succeeds.

5. The method according to claim 1, wherein the first device sends, using a first message generated in a WiFi protected setup (WPS) authentication process, the information used for obtaining a shared key; or
    wherein the first device sends, to the second device, a trigger message used for instructing the second device to start a WPS authentication process, and sends, using a second message generated in the WPS authentication process, the information used for obtaining a shared key; or
    wherein the first device sends, using the first message generated in a four-way handshake process, the information used for obtaining a shared key; or
    wherein the first device sends, using the trigger message used for instructing the second device to start a four-way handshake process, the information used for obtaining a shared key.

6. A key configuration method, comprising:
    providing, by a second device, a public key of the second device to a first device through a secure medium;
    receiving, by the second device, information used for obtaining a shared key and sent by the first device;
    obtaining, by the second device, a shared key using a private key of the second device and the information that is used for obtaining a shared key, wherein the first device obtains the shared key using the information used for obtaining a shared key or using a private key of the first device, wherein the first device and the second device perform a secure connection using the shared key or a derivative key of the shared key, wherein providing, by the second device, the public key of the second device to the first device through the secure medium comprises providing, by the second device, the public key of the second device to the first device by one of providing an identifier to the first device to perform scanning, using a Universal Serial Bus (USB), or using near field communication (NFC); and
    predetermining, by the first device and the second device, a key exchange algorithm,
    wherein the information used for obtaining a shared key is a public key of the first device,
    wherein obtaining, by the first device, the shared key using the private key of the first device comprises generating, by the first device, the shared key using the public key of the second device and the private key of the first device according to the key exchange algorithm,
    wherein obtaining the shared key using the private key of the second device and the information that is used for obtaining the shared key comprises generating, by the second device, the shared key using the public key of the first device and the private key of the second device according to the key exchange algorithm,
    wherein predetermining, by the first device and the second device, the key exchange algorithm comprises at least one of:
        a parameter used by the key exchange algorithm being preconfigured on the first device and the second device; and
        receiving, by the first device and the second device, a parameter used by the key exchange algorithm and sent by a third-party configuration device.

7. The method according to claim 6, wherein receiving information used for obtaining the shared key and sent by the first device comprises:
    receiving, by the second device, an encryption result that is obtained after the first device encrypts the public key of the first device using the public key of the second device; and
    decrypting the encryption result to obtain the public key of the first device.

8. The method according to claim 6, further comprising:
    generating, by the first device after obtaining the shared key, a first verification value using at least one of the shared key, the derivative key of the shared key, and plaintext that is pre-agreed between the first device and the second device;
    sending the first verification value to the second device;
    generating, by the second device, a second verification value using at least one of the shared key obtained by the second device, the derivative key of the shared key, and the plaintext that is pre-agreed between the second device and the first device; and
    verifying the generated second verification value with the received first verification value, wherein the verification succeeds when the first verification value is consistent with the second verification value, and wherein the second device performs a secure connection with the first device using the shared key or the derivative key of the shared key when the verification succeeds.

9. The method according to claim 6, further comprising:
    generating, by the second device after obtaining the shared key, a third verification value using at least one of the shared key, the derivative key of the shared key, and plaintext that is pre-agreed between the second device and the first device;
    sending the third verification value to the first device, so that the first device generates a fourth verification value using at least one of the shared key obtained by the first device, the derivative key of the shared key, and the plaintext that is pre-agreed between the first device and the second device; and
    verifying the generated fourth verification value with the received third verification value, wherein the verification succeeds when the third verification value is consistent with the fourth verification value, and wherein the first device performs a secure connection with the second device using the shared key or the derivative key of the shared key when the verification succeeds.

10. The method according to claim 6, wherein the second device receives, using a first message generated in a WPS authentication process, the information used for obtaining the shared key; or
    wherein the second device receives a trigger message used for instructing the second device to start a WPS authentication process and sent by the first device, and receives, using a second message generated in the WPS authentication process, the information used for obtaining a shared key; or
    wherein the second device receives, using the first message generated in a four-way handshake process, the information used for obtaining a shared key; or
    wherein the second device receives, using the trigger message used for instructing the second device to start a four-way handshake process, the information used for obtaining a shared key.

11. A key configuration apparatus located in a first device, the apparatus comprising:
    a memory configured to store instructions; and
    a processor coupled to the memory, wherein the processor is configured to execute the instructions and cause the apparatus to:

acquire a public key of a second device through a secure medium;

send information used for obtaining a shared key to the second device;

obtain the shared key using the information used for obtaining a shared key or using a private key of the first device, wherein the information used for obtaining the shared key is used for the second device to obtain the shared key with reference to a private key of the second device, wherein the shared key or a derivative key of the shared key is used for a secure connection between the first device and the second device;

acquire the public key of the second device from the second device by one of scanning an identifier, using a Universal Serial Bus (USB), or using near field communication (NFC);

generate the shared key using the public key of the second device and the private key of the first device according to a key exchange algorithm predetermined by the first device and the second device;

send a public key of the first device to the second device, so that the second device generates the shared key using the public key of the first device and the private key of the second device according to the key exchange algorithm; and store a preconfigured parameter used by the key exchange algorithm, or receive and store a parameter used by the key exchange algorithm and sent by a third-party configuration device.

12. The apparatus according to claim 11, wherein when sending the public key of the first device to the second device, the processor is configured to send an encryption result to the second device after the public key of the first device is encrypted using the public key of the second device, so that the second device obtains the public key of the first device after decrypting the encryption result.

13. The apparatus according to claim 11, wherein the processor is further configured to cause the apparatus to:

generate, after obtaining the shared key, a first verification value using at least one of the shared key, the derivative key of the shared key, and plaintext that is pre-agreed between the first device and the second device; and send the first verification value to the second device so that the second device generates a second verification value using at least one of the shared key obtained by the second device, the derivative key of the shared key, and the plaintext that is pre-agreed between the second device and the first device; and verify the generated second verification value with the received first verification value, wherein the verification succeeds when the first verification value is consistent with the second verification value, and wherein the second device performs a secure connection with the first device using the shared key or the derivative key of the shared key when the verification succeeds.

14. The apparatus according to claim 11, wherein the processor is further configured to cause the apparatus to:

generate, after a third verification value sent by the second device is received, a fourth verification value using at least one of the shared key, the derivative key of the shared key, and plaintext that is pre-agreed between the first device and the second device; and verify the generated fourth verification value with the received third verification value, wherein the verification succeeds when the third verification value is consistent with the fourth verification value, wherein the first device performs a secure connection with the second device using the shared key or the derivative key of the shared key when the verification succeeds, and wherein the third verification value is generated by the second device after the second device obtains the shared key and using at least one of the shared key, the derivative key of the shared key, and the plaintext that is pre-agreed between the second device and the first device.

15. The apparatus according to claim 11, wherein the processor is further configured to cause the apparatus to at least one of:

send, using a first message generated in a WPS authentication process, the information used for obtaining a shared key;

send, to the second device, a trigger message used for instructing the second device to start a WPS authentication process, and send, using a second message generated in the WPS authentication process, the information used for obtaining a shared key;

send, using the first message generated in a four-way handshake process, the information used for obtaining a shared key; and send, using the trigger message used for instructing the second device to start a four-way handshake process, the information used for obtaining a shared key.

* * * * *